US012587881B2

(12) United States Patent
Takeda et al.

(10) Patent No.: US 12,587,881 B2
(45) Date of Patent: Mar. 24, 2026

(54) SECURITY FOR DOWNLINK SIGNALING

(71) Applicant: QUALCOMM Incorporated, San Diego, CA (US)

(72) Inventors: Kazuki Takeda, Minato-ku (JP); Alberto Rico Alvarino, San Diego, CA (US); Javier Rodriguez Fernandez, San Diego, CA (US); Le Liu, San Jose, CA (US); Xiao Feng Wang, San Diego, CA (US); Umesh Phuyal, San Diego, CA (US); Peter Gaal, San Diego, CA (US); Juan Montojo, San Diego, CA (US); Edward George Tiedemann, Jr., Concord, MA (US)

(73) Assignee: QUALCOMM INCORPORATED, San Diego, CA (US)

( * ) Notice: Subject to any disclaimer, the term of this patent is extended or adjusted under 35 U.S.C. 154(b) by 525 days.

(21) Appl. No.: 18/083,332

(22) Filed: Dec. 16, 2022

(65) Prior Publication Data

US 2024/0205704 A1      Jun. 20, 2024

(51) Int. Cl.
*H04W 24/08*       (2009.01)
*H04W 56/00*       (2009.01)

(52) U.S. Cl.
CPC ......... *H04W 24/08* (2013.01); *H04W 56/001* (2013.01)

(58) Field of Classification Search
None
See application file for complete search history.

(56) References Cited

U.S. PATENT DOCUMENTS

| | | | | |
|---|---|---|---|---|
| 2010/0189032 A1* | 7/2010 | Chen | .................... | H04B 1/7143 |
| | | | | 370/328 |
| 2011/0032926 A1 | 2/2011 | Xia et al. | | |
| 2016/0255609 A1* | 9/2016 | Kim | ..................... | H04W 72/23 |
| | | | | 370/203 |
| 2018/0359755 A1* | 12/2018 | Sun | ........................ | H04L 5/0053 |
| 2019/0393998 A1* | 12/2019 | Lei | ........................ | H04W 88/08 |
| 2021/0044397 A1* | 2/2021 | Khoshnevisan | ...... | H04L 5/0032 |
| 2022/0408464 A1* | 12/2022 | MolavianJazi | ... | H04W 72/0453 |
| 2024/0073077 A1* | 2/2024 | Park | .................. | H04L 27/26526 |

FOREIGN PATENT DOCUMENTS

| | | |
|---|---|---|
| WO | WO-2013173961 A1 | 11/2013 |
| WO | WO-2022031692 A1 | 2/2022 |

OTHER PUBLICATIONS

International Search Report and Written Opinion—PCT/US2023/080072—ISA/EPO—Jan. 30, 2024.

* cited by examiner

*Primary Examiner* — Saad Khawar
(74) *Attorney, Agent, or Firm* — Holland & Hart LLP

(57)       ABSTRACT

Methods, systems, and devices for wireless communications are described. A user equipment (UE) may monitor a set of resources for one or more synchronization signal blocks (SSBs) associated with one or more pseudo-random sequences. The one or more pseudo-random sequences and the set of resources may be indicated by an output of a pseudo-random function (PRF) that is based on a timing parameter, a cell identifier, and a key. In some examples, the UE may monitor a set of resources within a control resource set for a downlink control channel, where the set of resources for the downlink control channel is based on an output of the PRF. The UE communicate with a network entity via a cell associated with the cell identifier based on the monitoring.

27 Claims, 18 Drawing Sheets

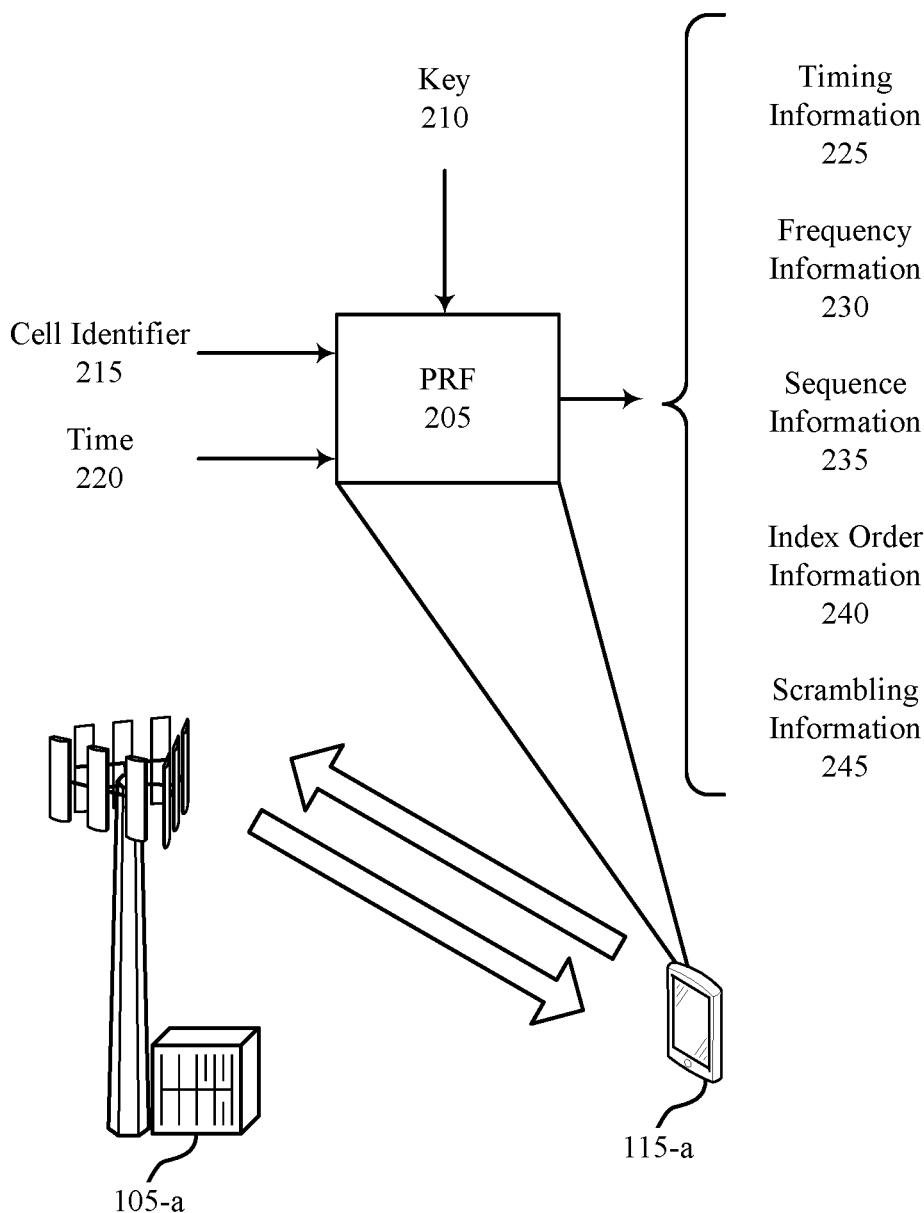
Key
210
Cell Identifier
215
Time
220
PRF
205
Timing
Information
225
Frequency
Information
230
Sequence
Information
235
Index Order
Information
240
Scrambling
Information
245
115-a
105-a
200
FIG. 2

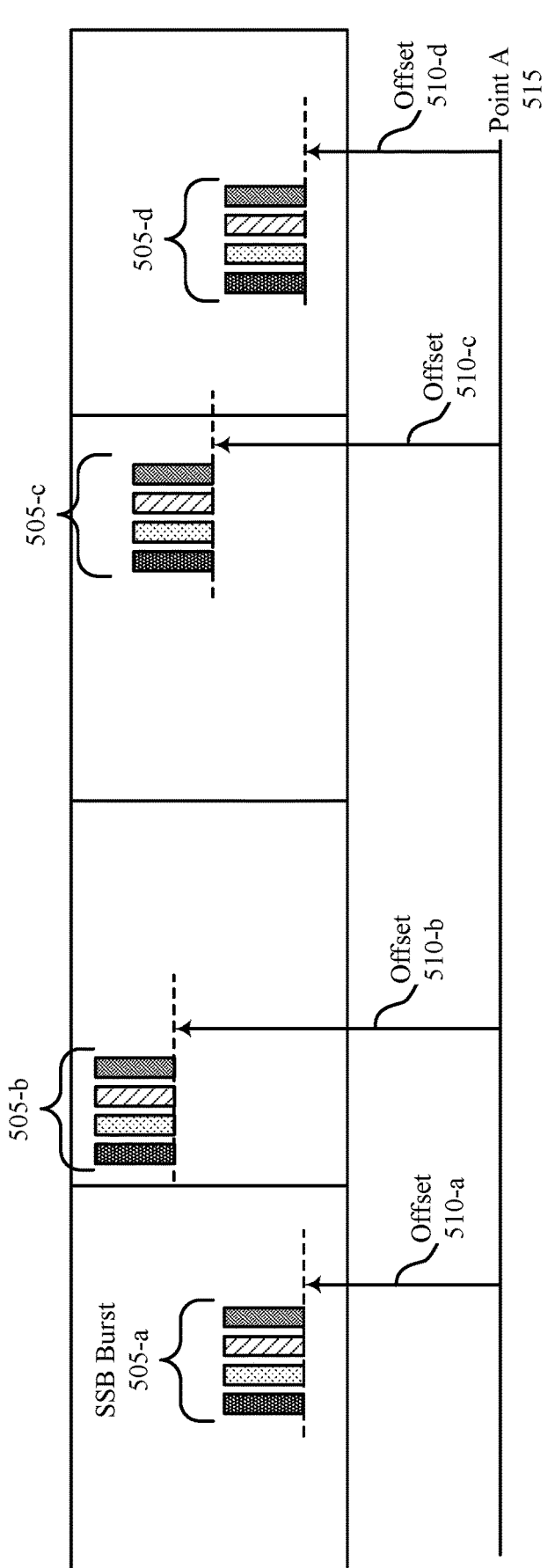
FIG. 5

Common Search
Space 805

UE-Specific
Search Space 810

800

1110

1120

1115

1105

1100

Figure 15:
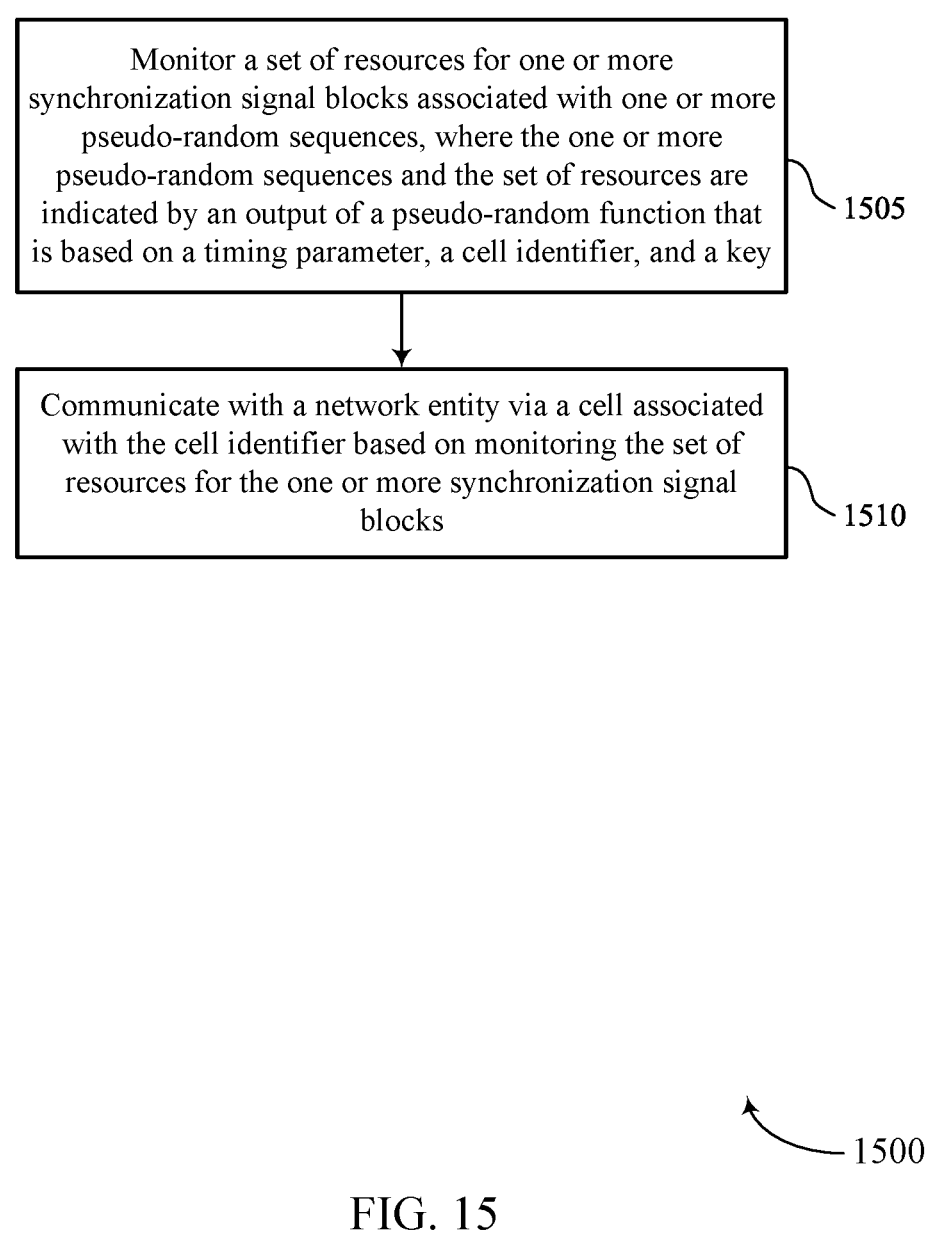

Monitor a set of resources for one or more synchronization signal blocks associated with one or more pseudo-random sequences, where the one or more pseudo-random sequences and the set of resources are indicated by an output of a pseudo-random function that is based on a timing parameter, a cell identifier, and a key ⟍ 1505

Communicate with a network entity via a cell associated with the cell identifier based on monitoring the set of resources for the one or more synchronization signal blocks ⟍ 1510

Monitor a set of resources for a control message via a downlink control channel

1705

Descramble a payload of the control message based on a scrambling sequence, where the scrambling sequence is indicated by an output of a pseudo-random function that is based on a timing parameter, a cell identifier, and a key

1710

1700

SECURITY FOR DOWNLINK SIGNALING

FIELD OF TECHNOLOGY

The following relates to wireless communications, including security for downlink signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support security for downlink signaling. For example, the described techniques provide for using a pseudo-random function (PRF) to pseudo-randomize resources or aspects of a synchronization signal block (SSB) or a control channel. For example, a user equipment or a network entity, or both, may utilize a PRF to enable hopping for SSBs. The PRF may use a key (e.g., a UE-specific key or UE-common key), timing information, and a physical cell identifier as inputs, and the PRF may output timing information, frequency information, or sequence information for SSBs. For example, the PRF may output timing information for SSBs, such as a starting symbol for an SSB burst. In some examples, the PRF may output frequency information for SSBs, such as a frequency index or synchronization raster index for an SSB burst. In some examples, the PRF may output a sequence index for an SSB burst or for individual SSBs of an SSB burst. In some examples, an initial control resource set or an initial downlink bandwidth part may be configured to be offset from the SSBs, and the offset may be indicated or output by a PRF.

Similar techniques may be implemented to pseudo-randomize parameters for a control channel, such as a physical downlink control channel (PDCCH). For example, timing information, frequency information, and scrambling information for a PDCCH may be pseudo-randomized. A UE may determine the timing information, frequency information, or scrambling information for the control channel via an output of a PRF. In some examples, parameters for a control resource set including the PDCCH or a search space set including the PDCCH may be pseudo-randomized.

A method for wireless communications at a UE is described. The method may include monitoring a set of resources for one or more SSBs associated with one or more pseudo-random sequences, where the one or more pseudo-random sequences and the set of resources are indicated by an output of a PRF that is based on a timing parameter, a cell identifier, and a key and communicate with a network entity via a cell associated with the cell identifier based on monitoring the set of resources for the one or more SSBs.

An apparatus for wireless communications at a UE is described. The apparatus may include a processor, memory coupled with the processor, and instructions stored in the memory. The instructions may be executable by the processor to cause the apparatus to monitor a set of resources for one or more SSBs associated with one or more pseudo-random sequences, where the one or more pseudo-random sequences and the set of resources are indicated by an output of a PRF that is based on a timing parameter, a cell identifier, and a key and communicate with a network entity via a cell associated with the cell identifier based on monitoring the set of resources for the one or more SSBs.

Another apparatus for wireless communications at a UE is described. The apparatus may include means for monitoring a set of resources for one or more SSBs associated with one or more pseudo-random sequences, where the one or more pseudo-random sequences and the set of resources are indicated by an output of a PRF that is based on a timing parameter, a cell identifier, and a key and means for communicate with a network entity via a cell associated with the cell identifier based on monitoring the set of resources for the one or more SSBs.

A non-transitory computer-readable medium storing code for wireless communications at a UE is described. The code may include instructions executable by a processor to monitor a set of resources for one or more SSBs associated with one or more pseudo-random sequences, where the one or more pseudo-random sequences and the set of resources are indicated by an output of a PRF that is based on a timing parameter, a cell identifier, and a key and communicate with a network entity via a cell associated with the cell identifier based on monitoring the set of resources for the one or more SSBs.

In some examples of the method, apparatuses, and non-transitory computer-readable medium described herein, monitoring the set of resources may include operations, features, means, or instructions for monitoring for a first burst of SSBs associated with a first pseudo-random sequence of the one or more pseudo-random sequences indicated by the output of the PRF and monitoring for a second burst of SSBs associated with a second pseudo-random sequence of the one or more pseudo-random sequences indicated by the output of the PRF.

Some examples of the method, apparatuses, and non-transitory computer-readable medium described herein may further include operations, features, means, or instructions for generating the first pseudo-random sequence and the second pseudo-random sequence based on one or more calls to the PRF.

In some examples of the method, apparatuses, and non-transitory computer-readable medium described herein, monitoring the set of resources may include operations, features, means, or instructions for monitoring for a first SSB, associated with a first pseudo-random sequence of the one or more pseudo-random sequences, of a burst of SSBs, where the first pseudo-random sequence may be indicated by the output of the PRF and monitoring for a second SSB, associated with a second pseudo-random sequence of the one or more pseudo-random sequences, of the burst of SSBs, where the second pseudo-random sequence may be indicated by the output of the PRF.

In some examples of the method, apparatuses, and non-transitory computer-readable medium described herein, monitoring the set of resources may include operations, features, means, or instructions for monitoring for a first burst of SSBs, where a first ordering of SSB indexes for the first burst of synchronization blocks may be indicated by the output of the PRF and monitoring for a second burst of SSBs, where a second ordering of SSB indexes for the second burst of synchronization blocks may be indicated by the output of the PRF.

In some examples of the method, apparatuses, and non-transitory computer-readable medium described herein, the output of the PRF indicates the first ordering and the second ordering based on a quantity of symbols per half-frame.

Some examples of the method, apparatuses, and non-transitory computer-readable medium described herein may further include operations, features, means, or instructions for monitoring for a first SSB of a burst of SSBs during a starting symbol of the burst of SSBs, where the starting symbol may be indicated by the output of the PRF.

In some examples of the method, apparatuses, and non-transitory computer-readable medium described herein, the output of the PRF indicates the starting symbol of the burst of SSBs based on a quantity of symbols per half-frame.

In some examples of the method, apparatuses, and non-transitory computer-readable medium described herein, monitoring the set of resources may include operations, features, means, or instructions for monitoring for a first burst of SSBs offset in frequency from a reference point by a first offset indicated by the output of the PRF and monitoring for a second burst of SSBs offset in frequency from the reference point by a second offset indicated by the output of the PRF.

In some examples of the method, apparatuses, and non-transitory computer-readable medium described herein, the output of the PRF indicates a first index of a synchronization raster for the first offset and a second index of the synchronization raster for the second offset.

In some examples of the method, apparatuses, and non-transitory computer-readable medium described herein, monitoring the set of resources may include operations, features, means, or instructions for monitoring for a first synchronization signal in a first SSB of the one or more SSBs, where a first sequence of the first synchronization signal may be indicated by the output of the PRF and monitoring for a second synchronization signal in the first SSB, where a second sequence of the second synchronization signal may be indicated by the output of the PRF.

Some examples of the method, apparatuses, and non-transitory computer-readable medium described herein may further include operations, features, means, or instructions for monitoring a control resource set that may be offset in frequency from the one or more SSBs by a fixed quantity of resource blocks.

Some examples of the method, apparatuses, and non-transitory computer-readable medium described herein may further include operations, features, means, or instructions for monitoring, for a first duration, a control resource set according to a first offset in frequency from a first burst of SSBs of the one or more SSBs, the first offset indicated by the output of the PRF and monitoring, for a second duration, the control resource set according to a second offset in frequency from a second burst of SSBs of the one or more SSBs, the second offset indicated by the output of the PRF.

In some examples of the method, apparatuses, and non-transitory computer-readable medium described herein, the first offset may be indicated by the output of the PRF based on a first value indicated by a first master information block of the first burst of SSBs, and the second offset may be indicated by the output of the PRF based on a second value indicated by a second master information block of the second burst of SSBs.

Some examples of the method, apparatuses, and non-transitory computer-readable medium described herein may further include operations, features, means, or instructions for receiving, via a secure wireless channel, a control message indicating the key, where the key may be a UE-specific key or a UE-common key.

A method for wireless communications at a UE is described. The method may include monitoring a set of resources within a control resource set for a downlink control channel, where the set of resources is based on an output of a PRF, and where the output of the PRF is based on a timing parameter, a cell identifier, and a key and communicate with a network entity via a cell associated with the cell identifier based on monitoring the set of resources for the downlink control channel.

An apparatus for wireless communications at a UE is described. The apparatus may include a processor, memory coupled with the processor, and instructions stored in the memory. The instructions may be executable by the processor to cause the apparatus to monitor a set of resources within a control resource set for a downlink control channel, where the set of resources is based on an output of a PRF, and where the output of the PRF is based on a timing parameter, a cell identifier, and a key and communicate with a network entity via a cell associated with the cell identifier based on monitoring the set of resources for the downlink control channel.

Another apparatus for wireless communications at a UE is described. The apparatus may include means for monitoring a set of resources within a control resource set for a downlink control channel, where the set of resources is based on an output of a PRF, and where the output of the PRF is based on a timing parameter, a cell identifier, and a key and means for communicate with a network entity via a cell associated with the cell identifier based on monitoring the set of resources for the downlink control channel.

A non-transitory computer-readable medium storing code for wireless communications at a UE is described. The code may include instructions executable by a processor to monitor a set of resources within a control resource set for a downlink control channel, where the set of resources is based on an output of a PRF, and where the output of the PRF is based on a timing parameter, a cell identifier, and a key and communicate with a network entity via a cell associated with the cell identifier based on monitoring the set of resources for the downlink control channel.

In some examples of the method, apparatuses, and non-transitory computer-readable medium described herein, monitoring the set of resources may include operations, features, means, or instructions for monitoring a first set of resource blocks for a first downlink control channel, where a first initial resource block of the first set of resource blocks may be indicated by the output of the PRF and monitoring a second set of resource blocks for a second downlink control channel, where a second initial resource block of the second set of resource blocks may be indicated by the output of the PRF.

In some examples of the method, apparatuses, and non-transitory computer-readable medium described herein, the first set of resource blocks may be consecutive within a downlink bandwidth part of the cell.

In some examples of the method, apparatuses, and non-transitory computer-readable medium described herein, the first set of resource blocks may be non-consecutive and abut frequency edges of a downlink bandwidth part of the cell.

Some examples of the method, apparatuses, and non-transitory computer-readable medium described herein may further include operations, features, means, or instructions for determining the control resource set from a set of multiple control resource sets based on the output of the PRF, where the output of the PRF may be based on a search space identifier for a search space of the downlink control channel.

Some examples of the method, apparatuses, and non-transitory computer-readable medium described herein may further include operations, features, means, or instructions for receiving control signaling indicating that a control resource set hopping may be enabled, where the control resource set may be determined from the set of multiple control resource sets based on the control resource set hopping being enabled.

In some examples of the method, apparatuses, and non-transitory computer-readable medium described herein, monitoring the set of resources may include operations, features, means, or instructions for monitoring a subset of search space sets from a set of multiple search space sets, where the subset of search space sets may be indicated by the output of the PRF.

Some examples of the method, apparatuses, and non-transitory computer-readable medium described herein may further include operations, features, means, or instructions for determining a set of parameters for the control resource set from a set of multiple sets of parameters, where the set of parameters may be indicated by the output of the PRF.

In some examples of the method, apparatuses, and non-transitory computer-readable medium described herein, the set of parameters for the control resource set includes a frequency domain resource allocation, a control resource set duration, a control channel element-to-resource element group mapping, a precoder granularity, a transmission configuration indicator state, or any combination thereof.

Some examples of the method, apparatuses, and non-transitory computer-readable medium described herein may further include operations, features, means, or instructions for determining a set of parameters for a search space set for the downlink control channel from a set of multiple sets of parameters, where the set of parameters may be indicated by the output of the PRF.

In some examples of the method, apparatuses, and non-transitory computer-readable medium described herein, the set of parameters for the search space set includes a monitoring periodicity or resource indicators for monitoring occasions, or both.

A method for wireless communications at a UE is described. The method may include monitoring a set of resources for a control message via a downlink control channel and descrambling a payload of the control message based on a scrambling sequence, where the scrambling sequence is indicated by an output of a PRF that is based on a timing parameter, a cell identifier, and a key.

An apparatus for wireless communications at a UE is described. The apparatus may include a processor, memory coupled with the processor, and instructions stored in the memory. The instructions may be executable by the processor to cause the apparatus to monitor a set of resources for a control message via a downlink control channel and descramble a payload of the control message based on a scrambling sequence, where the scrambling sequence is indicated by an output of a PRF that is based on a timing parameter, a cell identifier, and a key.

Another apparatus for wireless communications at a UE is described. The apparatus may include means for monitoring a set of resources for a control message via a downlink control channel and means for descrambling a payload of the control message based on a scrambling sequence, where the scrambling sequence is indicated by an output of a PRF that is based on a timing parameter, a cell identifier, and a key.

A non-transitory computer-readable medium storing code for wireless communications at a UE is described. The code may include instructions executable by a processor to monitor a set of resources for a control message via a downlink control channel and descramble a payload of the control message based on a scrambling sequence, where the scrambling sequence is indicated by an output of a PRF that is based on a timing parameter, a cell identifier, and a key.

Some examples of the method, apparatuses, and non-transitory computer-readable medium described herein may further include operations, features, means, or instructions for determining an initial value for the scrambling sequence based on the output of the PRF and descrambling the payload may be based on the initial value for the scrambling sequence.

A method for wireless communications at a UE is described. The method may include monitoring a set of resources for a control message via a downlink control channel and demodulating the control message based on a set of multiple demodulation reference signals received via the downlink control channel, where sequences for the set of multiple demodulation reference signals are indicated by an output of a PRF that is based on a timing parameter, a cell identifier, and a key.

An apparatus for wireless communications at a UE is described. The apparatus may include a processor, memory coupled with the processor, and instructions stored in the memory. The instructions may be executable by the processor to cause the apparatus to monitor a set of resources for a control message via a downlink control channel and demodulate the control message based on a set of multiple demodulation reference signals received via the downlink control channel, where sequences for the set of multiple demodulation reference signals are indicated by an output of a PRF that is based on a timing parameter, a cell identifier, and a key.

Another apparatus for wireless communications at a UE is described. The apparatus may include means for monitoring a set of resources for a control message via a downlink control channel and means for demodulating the control message based on a set of multiple demodulation reference signals received via the downlink control channel, where sequences for the set of multiple demodulation reference signals are indicated by an output of a PRF that is based on a timing parameter, a cell identifier, and a key.

A non-transitory computer-readable medium storing code for wireless communications at a UE is described. The code may include instructions executable by a processor to monitor a set of resources for a control message via a downlink control channel and demodulate the control message based on a set of multiple demodulation reference signals received via the downlink control channel, where sequences for the set of multiple demodulation reference signals are indicated by an output of a PRF that is based on a timing parameter, a cell identifier, and a key.

Some examples of the method, apparatuses, and non-transitory computer-readable medium described herein may further include operations, features, means, or instructions for determining quadrature phase shift keying symbols for the set of multiple demodulation reference signals based on the sequences for the set of multiple demodulation reference signals.

BRIEF DESCRIPTION OF THE DRAWINGS

FIG. 2 illustrates an example of a wireless communications system that supports security for downlink signaling in accordance with one or more aspects of the present disclosure.

FIG. 5 illustrates an example of a frequency domain randomization that supports security for downlink signaling in accordance with one or more aspects of the present disclosure.

FIGS. 15 through 18 illustrate flowcharts showing methods that support security for downlink signaling in accordance with one or more aspects of the present disclosure.

DETAILED DESCRIPTION

A user equipment (UE) and a network entity may communicate critical information on multiple different channels. For example, a synchronization signal block (SSB) may be a critical channel for initial access procedures, maintaining synchronization, radio link monitoring (RLM) and radio resource management (RRM), and beam management, among other procedures. In some systems, SSBs are transmitted with set periodicities at set time-frequency resources, which may enable UEs to easily detect and track the SSBs for performing the critical procedures. For higher security networks, such as a tactical network, it is desired that physical layer security be implemented to prevent spoofers or attacker devices from interfering with or receiving signaling carrying critical and secure information. For example, a jammer device could emit noise onto an SSB bandwidth with relatively low power to prevent legitimate devices from receiving the SSB signaling. In another example, a spoofer or eavesdropper could acquire a network configuration (e.g., system information) if the critical signals are predictably transmitted or configured.

A wireless communications system described herein may utilize a pseudo-random function (PRF) to enable hopping for SSBs. The PRF may use a shared key (e.g., a UE-specific key or UE-common key), timing information, and a physical cell identifier as inputs, and the PRF may output timing information, frequency information, or sequence information for SSBs. For example, the PRF may output timing information for SSBs, such as a starting symbol for an SSB burst. In some examples, the PRF may output frequency information for SSBs, such as a frequency index or synchronization raster index for an SSB burst. In some examples, the PRF may output a sequence index for an SSB burst or for individual SSBs of an SSB burst. In some examples, an initial control resource set (e.g., control resource set 0) may be configured to be offset from the SSBs, and the offset may be indicated or output by a PRF.

Similar techniques may be implemented to pseudo-randomize parameters for a control channel, such as a physical downlink control channel (PDCCH). For example, timing information, frequency information, and scrambling information for a PDCCH may be pseudo-randomized. A UE may determine the timing information, frequency information, or scrambling information for the control channel via an output of a PRF. In some examples, parameters for a control resource set including the PDCCH or a search space set including the PDCCH may be pseudo-randomized.

Aspects of the disclosure are initially described in the context of wireless communications systems. Aspects of the disclosure are further illustrated by and described with reference to apparatus diagrams, system diagrams, and flowcharts that relate to security for downlink signaling.

Figure 1:
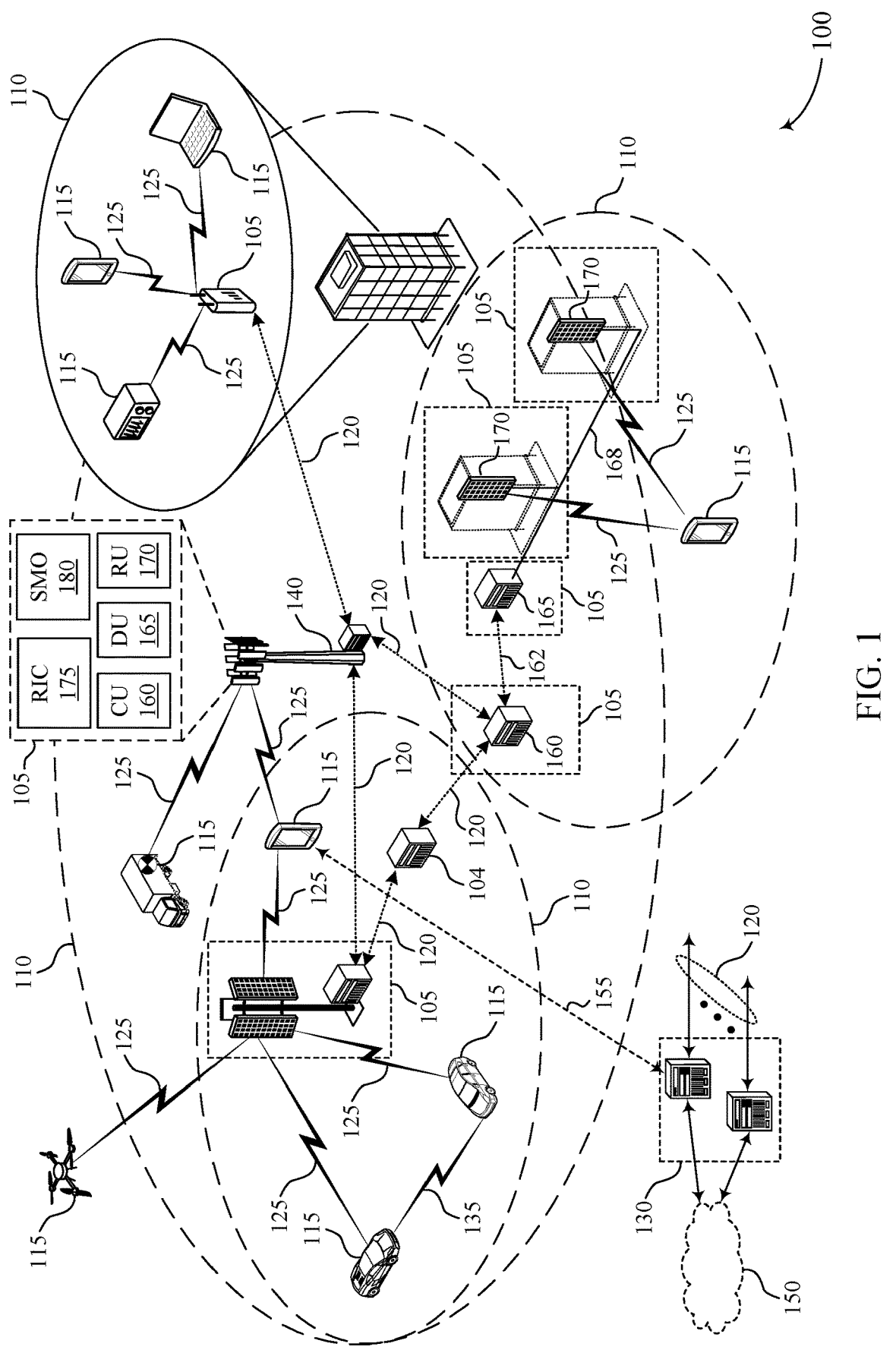
FIG. 1 illustrates an example of a wireless communications system that supports security for downlink signaling in accordance with one or more aspects of the present disclosure.

FIG. 1 illustrates an example of a wireless communications system 100 that supports security for downlink signaling in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support security for downlink signaling as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Af) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may periodically monitor for PDCCH, such as in configured symbols of each slot. Broadcast PDCCH may be configured such that any UE 115 can read the broadcast PDCCH. For example, a CRC of the broadcast PDCCH may be scrambled by a pre-configured or known corresponding radio network temporary identifier (RNTI). Unicast PDCCH may be configured such that only a target UE 115 can read the unicast PDCCH. A CRC of the unicast PDCCH may be scrambled by a UE-specific RNTI.

PDCCH resources may be configured in the frequency domain as part of a control resource set. A control resource set information element may indicate frequency domain resources (e.g., via a bitmap) for the control resource set in a downlink bandwidth part. Each bit may correspond to a consecutive six physical resource blocks (PRBs) from the lowest PRB in the downlink bandwidth part and indicate whether the control resource set is mapped to the corresponding PRBs. The time domain resources for a control resource set may be configured as part of a search space. A search space information element may indicate a slot periodicity offset for monitoring, a duration, and symbols within a slot for monitoring, which may indicate on which slot the UE 115 is to monitor for PDCCH in the search space set.

PDCCH may carry critical information for a UE 115 but may, in some systems, be susceptible to attacker devices. For example, a jammer device may block the UE 115 from receiving signaling on PDCCH. If the jammer knows slot timing for PDCCH, the jammer may transmit interfering signaling during the first three symbols of the slot to interfere with PDCCH. Additionally, an eavesdropper in some systems may read broadcast PDCCH. The eavesdropper may acquire a MIB, SIB1, and UE-specific RRC signaling by guessing where PDCCH candidates are and performing brute-force blind decodes for various hypothesis. In some cases, a spoofer may transmit false information on PDCCH or a UE by obtaining the broadcast PDCCH and performing random spoofing for UE-specific PDCCH.

An SSB may be used for cell detection and time-frequency synchronization. An SSB may be transmitted periodically on a frequency position of a synchronization raster. The SSB may include synchronization signals, such as a primary synchronization signal (PSS) and a secondary synchronization signal (SSS), and a physical broadcast channel (PBCH) that carries a master information block (MIB). The PSS and SSS sequences may be generated based on a cell identifier of a cell transmitting the SSB.

A candidate SSB index may be configured based on a carrier frequency range and a sub-carrier spacing (SCS) of a radio frequency band for the SSB. A candidate SSB may be mapped on a particular resource (e.g., symbol) identified based on a time range (e.g., per half-frame) and an index of candidate SSBs. The network (e.g., a network entity 105) may determine whether or not to actually transmit the candidate SSB. For a carrier, multiple SSBs may be transmitted to support multiple SSB beams for the carrier. A PBCH demodulation reference signal (DMRS) sequence and PBCH payload bits may indicate information of an index of the SSB in the cell. A common resource block (CRB) grid may be identified from a lowest resource block position of the detected SSB and a subcarrier offset between the CRB grid and the SSB (e.g., $k_{SSB}$), which may be indicated by the MIB and a payload bit of the PBCH.

From the detected SSB, an initial-access UE 115 may identify symbol, slot, subframe, or frame indexes in the time domain and CRB grid information in the frequency domain. The PBCH of the SSB may provide information of an initial control resource set, such as control resource set 0, and an initial downlink bandwidth part. A UE 115 may receive a physical downlink shared channel (PDSCH) carrying a system information block (SIB), such as SIB1, scheduled by a PDCCH in a Type-0 common search space (CSS) set. The SIB (e.g., SIB1) or an RRC message may indicate information for the control resource set, such as an absolute frequency of the SSBs and a reference point (e.g., Point A), an offset from the reference point to the SSBs, and an actual SSB mapping in an SSB burst and an SSB burst transmission periodicity.

An SSB may be a critical channel for initial access procedures, maintaining synchronization, RLM and RRM, and beam management, among other procedures. In some systems, SSBs are transmitted with set periodicities at set time-frequency resources, which may enable UEs 115 in these systems to easily detect and track the SSBs for performing the critical procedures. However, predictable SSB configurations may render these systems susceptible to spoofers or attacker devices, as these attacker devices may interfere with signaling carrying critical and secure information. For example, a jammer device could emit noise onto SSB bandwidth with relatively low power to prevent legitimate devices from receiving the SSB signaling. In another example, a spoofer or eavesdropper could acquire a network configuration (e.g., system information) if the critical signals are predictably transmitted or configured.

A wireless communications system described herein, such as the wireless communications system 100, may utilize a PRF to enable randomization for SSBs. For example, the wireless communications system 100 may utilize the PRF to enable randomizing or hopping sequence indexes, time resources, frequency resources, sequence information, or beam, antenna port, or spatial information, or any combination thereof, for SSBs. The wireless communications system 100 may be an example of a secure network, such as a tactical network, which may implement physical layer security to prevent spoofers or attacker devices from interfering with or receiving signaling carrying critical and secure information. The PRF may use a parameter denoting a key (e.g., a UE-specific key or UE-common key), timing information, and a physical cell identifier as inputs, and the PRF may output timing information, frequency information, sequence information, or beam/antenna port/spatial-domain information, for SSBs. For example, the PRF may output timing information for SSBs, such as a starting symbol for an SSB burst. In some examples, the PRF may output frequency information for SSBs, such as a frequency index or synchronization raster index for an SSB burst. In some examples, the PRF may output a sequence index for an SSB burst or for individual SSBs of an SSB burst. In some examples, the PRF may output a beam or antenna port index for an SSB burst or for individual SSBs of an SSB burst. In some examples, an initial control resource set (e.g., control resource set 0) may be configured to be offset from the SSBs, and the offset may be indicated or output by a PRF.

FIG. 2 illustrates an example of a wireless communications system 200 that supports security for downlink signaling in accordance with one or more aspects of the present disclosure. The wireless communications system 200 may include a UE 115-a and a network entity 105-a, which may be respective examples of a UE 115 and a network entity 105 as described herein. The wireless communications system 200 may be an example of a secure or tactical network and may implement techniques to provide physical layer security.

For example, the UE 115-a or the network entity 105-a, or both, may use a PRF 205 to enable hopping for SSBs. The UE 115-a may input information into the PRF 205, such as a key 210, a cell identifier 215, and a time 220 (or timing information). The PRF 205 may output, for example, timing information 225, frequency information 230, sequence information 235, or a beam or antenna port information for an SSB or an SSB burst, or any combination thereof, and the UE 115-a may monitor, search, or receive for SSB based on the output. The key 210 may be an example of a security key or a shared key. In some examples, the key 210 may be a UE-common or a UE-specific key. The key 210 may be provided to the UE 115-a via secure means, such as being pre-configured in the UE 115-a, installed into hardware of the UE 115-a, or provided via a secured channel. The cell identifier 215 may be an identifier of a cell or network entity 105 transmitting the SSBs, such as an identifier or cell identifier of the network entity 105-a. In some examples, the time 220 may be absolute time information (e.g., Coordinated Universal Time) with a certain (e.g., preconfigured or configured) granularity, such as to a certain millisecond, microsecond, etc.

In some examples, the PRF 205 may output timing information 225. The timing information 225 may indicate a symbol associated with an SSB burst, such as a first symbol of the SSB burst. For example, the timing information 225 may indicate a symbol index, such as an index in a slot or subframe or in a half or full radio frame (or longer cycle) where the SSB burst occurs.

In some examples, the PRF 205 may output frequency information 230. The frequency information 230 may indicate a frequency index associated with an SSB burst. For example, the PRF 205 may output a frequency index associated with the SSB burst, which may be an index of a synchronization raster within a possible or configured bandwidth of communication. In some examples, the bandwidth of the communication may be known by the UE 115-a (e.g., may be configured or preconfigured), or the UE 115-a may be provided an indication of the bandwidth via secure means, such as a secured channel.

In some examples, the PRF 205 may output sequence information 235. The sequence information 235 may indicate a sequence index associated with all SSBs of an SSB burst or a sequence index associated with each SSB of an SSB burst. The sequence index may be used (e.g., by the network entity 105-a) to generate sequences for PSS, SSS, PBCH DMRS, or any combination thereof. The sequence may be common or different for SSBs in an SSB burst. In some examples, the UE 115-a may monitor for the SSBs based on determining the sequence information 235, such as by identifying the correct sequences in an SSB burst and obtaining information from the SSBs after identifying the correct sequences.

In some examples, the PRF 205 may output index order information 240. For example, an SSB index order may be randomized or interleaved by the PRF 205. The UE 115-a may identify an SSB with an index in different SSB positions in different SSB bursts based on the index order information 240 output by the PRF 205.

In some examples, PSS and SSS sequences may be generated based on or using the PRF 205. In some examples, the sequences or sequence generation may be based on seeded parameters selected by using the sequence information 235 output by the PRF 205. For example, the network entity 105-a may transmit sequences used in other systems, but the selection of the sequences for an SSB or for an SSB burst may be randomized based on a seed output by the PRF 205, such as the sequence information 235. Additionally, or alternatively, the sequence information 235 may be used as an index of a sequence for PSS, SSS, or PBCH DMRS, or any combination thereof. For example, bits output by the PRF 205, such as the sequence information 235, may be used to generate a sequence of bits using a shift register, which may be further modulated to generate a binary phase shift-keying (BPSK)sequence or quadrature phase shift-keying (QPSK) sequence for PSS or SSS, or both. Additionally, or alternatively, bits output by the PRF 205, such as the sequence information 235, may be modulated to generate a BPSK sequence or QPSK sequence for PSS or SSS, or both. This may prevent an attacker from using a shift register to estimate an input from an initial output.

The wireless communications system 200 may additionally support techniques to randomize aspects of PDCCH. For example, the UE 115-a or the network entity 105-a, or both, may use the PRF 205 to enable PDCCH randomization.

In some examples of PDCCH randomization, the key 210 may be a UE-common key or a UE-specific key. For example, the key 210 may be a UE-common key for CSS sets or a UE-specific key for UE-specific search space (USS) sets. The UE-common key may be known or provided to the UE 115-a by secure means, such as being installed into UE hardware or being provided via a secure channel. The UE-specific key may be provided via a higher-layer configuration such as an RRC message. The UE-specific key may be common or different for different control resource sets or search spaces.

In some examples, the PRF 205 may output the timing information 225 indicating a symbol associated with a PDCCH to be monitored. For example, the PRF 205 may output a symbol index corresponding to an index in a slot or subframe or in a half or full radio frame (or longer cycle) corresponding to a PDCCH to be monitored by the UE 115-a.

In some examples, the PRF 205 may output frequency information 230 associated with a PDCCH to be monitored by the UE 115-*a*. For example, the PRF 205 may output a frequency index, such as an index of a synchronization raster within a possible bandwidth of communication, for the PDCCH.

In some examples, the PRF 205 may output scrambling information 245, such as a scrambling sequence information index associated with a PDCCH to be monitored by the UE 115-*a*. The sequence index may be used to generate a scrambling sequence for a PDCCH payload, CRC, or hash function, or any combination thereof, of the PDCCH to be monitored by the UE 115-*a*.

In some examples, frequency domain resources for a PDCCH may be randomized based on the PRF 205. For example, an association between a search space set and a control resource set may be randomized or interleaved by the PRF 205. In some examples, the association between a search space set and a control resource set may be randomized or interleaved based on control resource set hopping being enabled. By configuring different frequency domain resource allocations (FDRAs) for different control resource sets, frequency hopping for control resource sets may be enabled. In some examples, control resource set duration, control channel element (CCE)-to-resource element group (REG) mapping, or any combination thereof, may be randomized. For example, the association between a search space set and a control resource set may hop based on an output of the PRF 205, where the inputs to the PRF 205 include one or multiple keys, such as the key 210, the time 220, a physical cell identifier, and a search space identifier. The PRF 205 may output the frequency information 230 indicating different control resource sets for different occasions based on the inputs. For example, one search space may be configured for a set of DCI formats, a quantity of candidates, a monitoring periodicity, and monitoring occasions, and the search space may be associated with multiple different control resource sets across different occasions based on the output of the PRF 205. Each control resource set may, in some examples, have an FDRA, a control resource set duration, a CCE-to-REG mapping, a precoder granularity, and a transmission configuration indicator (TCI) state configured for the control resource set, which may be the same or different from other control resource sets.

In some examples, time domain resources for a PDCCH may be randomized based on the PRF 205. For example, the UE 115-*a* may selectively monitor a subset of search space sets instead of monitoring all configured search space sets in the downlink bandwidth part. Time granularity for the selective monitoring may be per-slot, per-subframe, per-frame, or any combination thereof. For example, the PRF 205 may output the timing information 225, which may indicate the subset of search space sets for the UE 115-*a* to monitor (e.g., instead of monitoring all search space sets).

In some examples, multiple sets of parameters may be configured for a control resource set. The UE 115-*a* or the network entity 105-*a*, or both, may use one set of parameters to identify the control resource set configuration at a given time. The selected set of parameters may be based on an output of the PRF 205. For example, the UE 115-*a* may identify a set of parameters for a control resource set (e.g., from multiple sets of parameters for the control resource set) based on the output of the PRF 205. For example, each set of parameters may include an FDRA, a control resource set duration, a CCE-to-REG mapping, a precoder granularity, or a TCI state, or any combination thereof.

In some examples, multiple sets of parameters may be configured for a search space set. The UE 115-*a* or the network entity 105-*a*, or both, may use one set of parameters to identify the search space set configuration at a given time. The selected set of parameters may be based on an output of the PRF 205. For example, the UE 115-*a* may identify a set of parameters for a search space set (e.g., from multiple sets of parameters for the search space set) based on the output of the PRF 205. For example, each set of parameters may include a monitoring periodicity, a set of monitoring occasions, or both.

In some examples, the wireless communications system 200 may support PDCCH payload scrambling, such as to differentiate UEs 115. For example, in some systems, a PDCCH payload may be scrambled with a static sequence, $\{c(0), c(1), \ldots, c(M_{bit}-1)\}$, where $M_{bit}$ is a quantity of bits in the PDCCH payload. The UE 115-*a* may identify an initial value for the static sequence based on Equation (1), where $n_{RNTI}$ is the C-RNTI for USS if a scrambling identifier is provided or 0 otherwise, and $n_{ID}$ is the scrambling identifier if provided for the USS or the physical cell identifier otherwise.

$$c_{init} = \left(n_{RNTI} * 2^{16} + n_{ID}\right) \bmod\left(2^{31}\right) \tag{1}$$

The wireless communications system 200 may support determining $c_{init}$ based on the PRF 205. For example, $c_{init}$ may be a function or an output of the PRF 205, such as via Equation (2). For example, inputs to the PRF 205 may be the key 210 (e.g., common key for CSS or UE-specific key f or USS), the time 220 (e.g., a symbol index in a frame or super-frame), and the cell identifier 215.

$$c_{init} = (PRF1(\text{key, time, } PCID))\bmod 2^{31} \tag{2}$$

The selection of $M_{bit}$ from $\{c(0), c(1), \ldots, c(M_{bit}-1)\}$ may be hopped using PRF, such as by using Equation (3).

$$b^\sim(i) = (b(i) + c((i + PRF2(\text{key, time, } PCID))\bmod M_{PN})\bmod 2 \tag{3}$$

In some examples, the wireless communications system 200 may support randomizing a PDCCH DMRS sequence, such as to differentiate different transmission points. For example, in some systems, QPSK symbols may be generated using the sequence $\{c((i)\}$. An initial value, $c_{init}$, may be determined according to Equation (4), where $N_{ID}$ is a scrambling identifier if provided and a physical cell identifier otherwise, and $14_{s,f}^{\mu}+l+1$ is the symbol index in the radio frame.

$$c_{init} = \left(2^{17}\left(14n_{s,f}^{\mu} + l + 1\right)(2N_{ID} + 1) + 2N_{ID}\right)\bmod 2^{31} \tag{4}$$

In some examples, QPSK symbols may be generated based on Equation (5).

$$r_l(m) = \frac{1}{\sqrt{2}}(1 - 2c(2m)) + j\frac{1}{\sqrt{2}}(1 - 2c(2m + 1)) \tag{5}$$

The wireless communications system 200 may support determining $c_{init}$ based on the PRF 205. For example, $c_{init}$ may be an output or function of the PRF 205, such as via Equation (2). For example, inputs to the PRF 205 may be the key 210 (e.g., common key for CSS or UE-specific key f or USS), the time 220 (e.g., a symbol index in a frame or super-frame), and the cell identifier 215. Selection of 2N bits from $\{c(0), c(1), \ldots, c(M_{PN}-1)\}$ may be hopped using the PRF, such as via Equation (7).

$$r_l(m) = \frac{1}{\sqrt{2}}(1 - 2c((2m + PRF2(\text{key, time, } PCID))\text{mod}M_{PN})) + \quad (7)$$

$$j\frac{1}{\sqrt{2}}(1 - 2c((2m + PRF2(\text{key, time, } PCID) + 1)\text{mod}M_{PN}))$$

In some examples, the output of the PRF 205 may be used as a bit sequence to generate QPSK sequences for PDCCH DMRS. In some examples, avoiding using a shift register in m-sequence generation may provide additional security.

In some examples, the wireless communications system 200 may support using the PRF 205 for a hash function, such as to reduce PDCCH blocking. For example, some systems may determine CCEs for blind decoding based on Equation (8), where $$Y_{p,n_{s,f}^{\mu}} = 0$$

for any CSS, and $$Y_{p,n_{s,f}^{\mu}} = \left(A_p \cdot Y_{p,n_{s,f}^{\mu}-1}\right)$$

mod 65537 for USS, where $A_p$=39827 for control resource set index p mod 3=0, $A_p$=39829 for control resource set index p mod 3=1, and $A_p$=39839 for control resource set index p mod 3=2, and $Y_{p,-1}=n_{RNTI}\neq0$.

The wireless communications system may support using a symbol-level hash (e.g., $Y_{p,14_{s_f}^{\mu}+l}$) instead of a slot-level hash and determining $Y_{p,-1}$ based on an output of the PRF 205. For example, $Y_{p,-1}$ may be a function of the PRF 205 for both CSS and USS.

Figure 3:
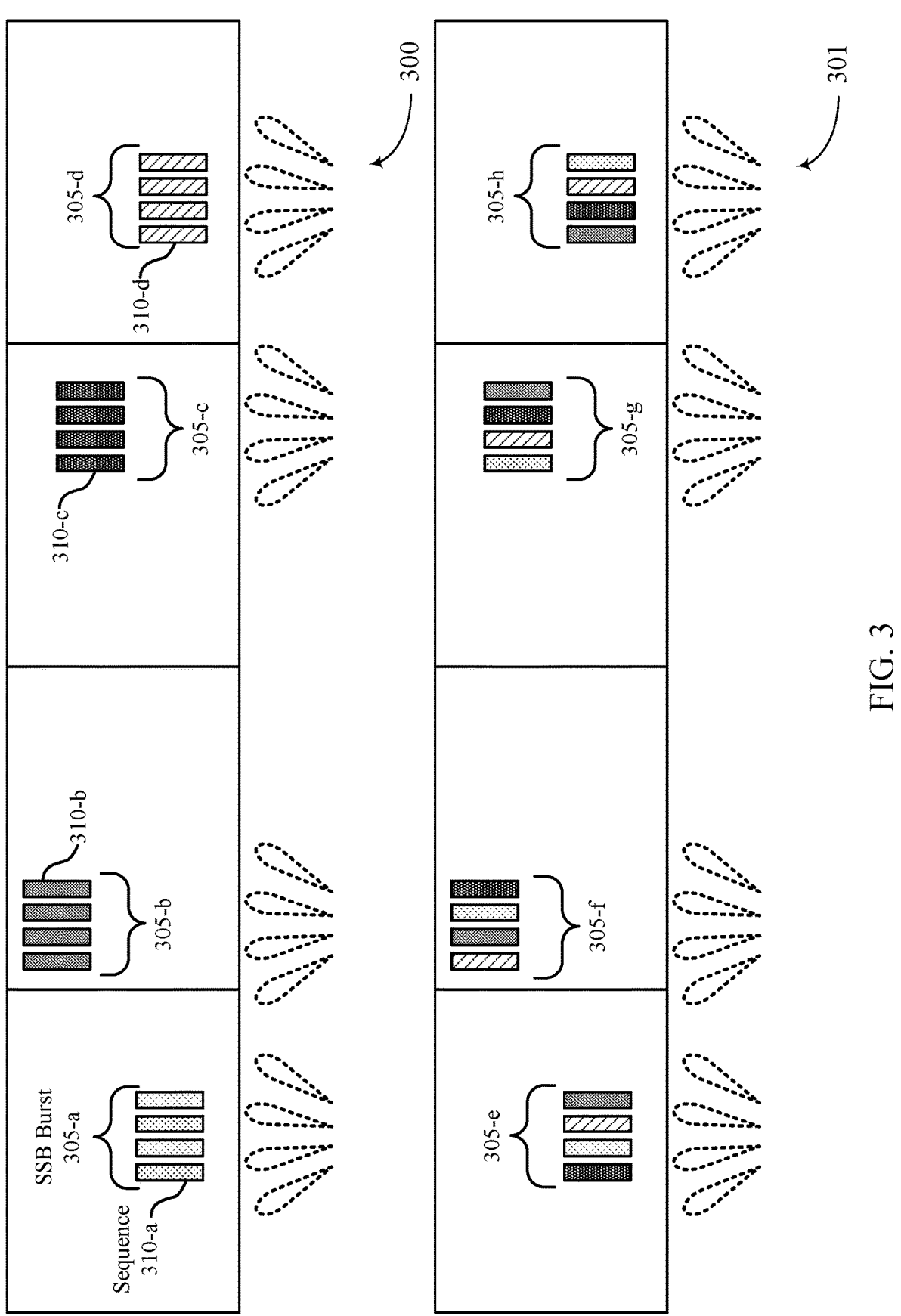
FIG. 3 illustrates examples of sequence randomizations that support security for downlink signaling in accordance with one or more aspects of the present disclosure.

FIG. 3 illustrates examples of a sequence randomization 300 and a sequence randomization 301 that support security for downlink signaling in accordance with one or more aspects of the present disclosure.

A UE 115 may receive SSBs in an SSB burst from a network entity 105. Sequences for the SSBs, or a sequence for the SSB burst, may be randomized based on a PRF as described herein. For example, the UE 115 or the network entity 105, or both, may input a key, time information, and a cell identifier into the PRF, and the PRF may output sequence information for SSBs.

For the sequence randomization 300, the PRF may output sequence information indicating a sequence index associated with all SSBs of an SSB burst. For example, SSBs in an SSB burst 305-a may have a first sequence 310-a. In a next occasion, SSBs of an SSB burst 305-b may have a second sequence 310-b. Similarly, SSBs of an SSB burst 305-c may have a third sequence 310-c, and SSBs of an SSB burst 305-d may have a fourth sequence 310-d. In the sequence randomization 300, each SSB of an SSB burst may have a same sequence, but the sequence for the SSB burst may be randomized based on the output of the PRF. For example, there may be common sequences across SSBs in an SSB burst but different sequences across SSB bursts.

For the sequence randomization 301, the PRF may output sequence information indicating a sequence index associated with each SSB of an SSB burst. For example, there may be different sequences across SSBs in a burst and different sequences across SSB bursts. For example, a first SSB of an SSB burst 305-e may have the third sequence 310-c, a second SSB of the SSB burst 305-e may have the first sequence 310-a, a third SSB of the SSB burst 305-e may have the fourth sequence 310-d, and the fourth SSB of the SSB burst 305-e may have the second sequence 310-b. An SSB burst 305-f, an SSB burst 305-g, and an SSB burst 305-h may each have different sequences or ordering of sequences, or both. For example, some SSBs in some SSB bursts may have other sequences than the sequences shown (e.g., a sequence not included in another SSB burst).

Figure 4:
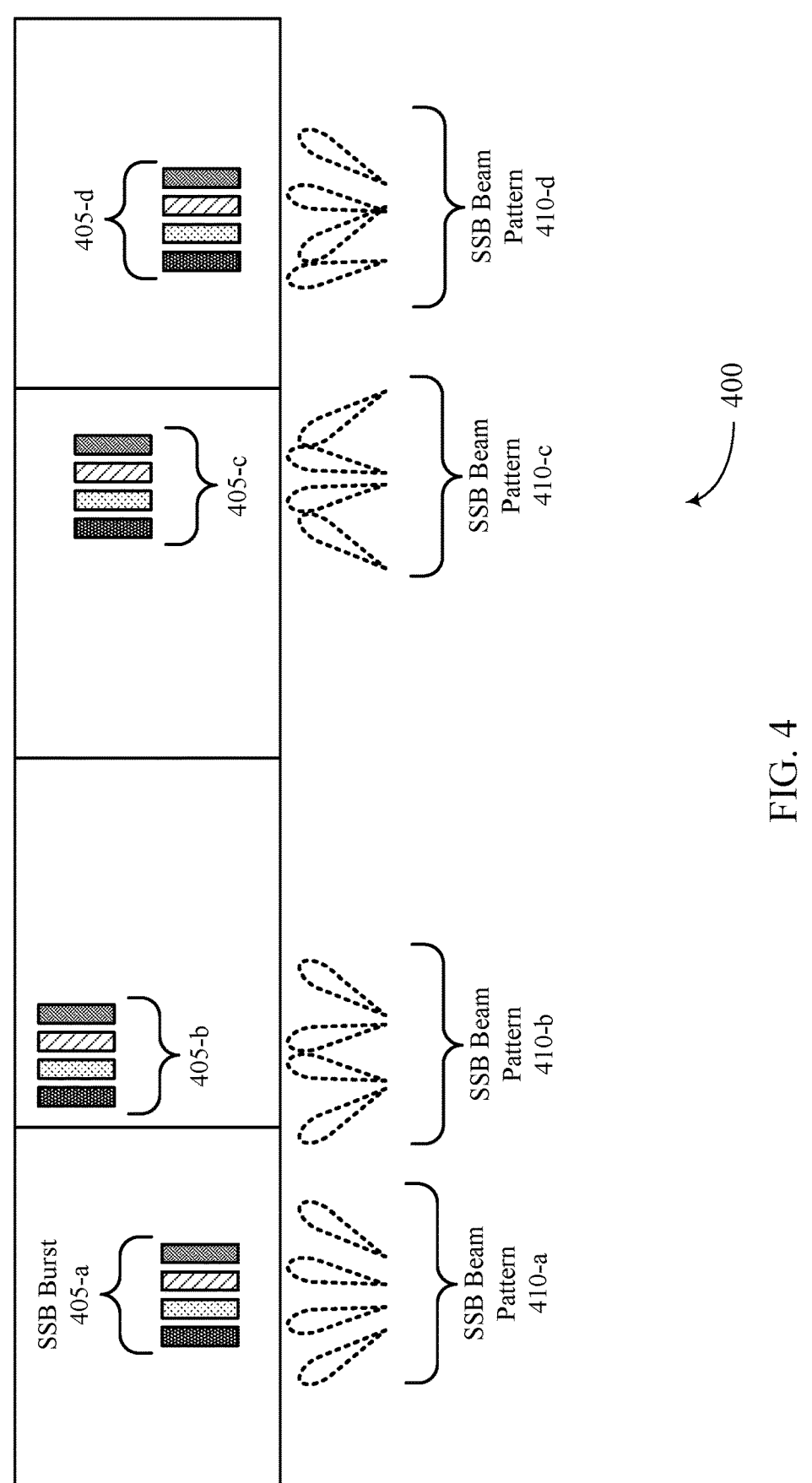
FIG. 4 illustrates an example of a beam pattern randomization that supports security for downlink signaling in accordance with one or more aspects of the present disclosure.

FIG. 4 illustrates an example of a beam pattern randomization 400 that supports security for downlink signaling in accordance with one or more aspects of the present disclosure.

A UE 115 may receive SSBs in an SSB burst from a network entity 105. A beam pattern for the SSBs in the SSB burst may be randomized based on a PRF as described herein. For example, the UE 115 or the network entity 105, or both, may input a key, time information, and a cell identifier into the PRF, and the PRF may output beam pattern information, or an index order, for the SSBs.

For example, in addition to time-frequency resource and sequence randomization, an SSB index ordering may be randomized or interleaved by a PRF. The UE 115 may identify an SSB with an index in different SSB positions in different SSB bursts. In some examples, the network entity 105 may change an SSB beam sweeping pattern in different SSB bursts.

For example, an SSB burst 405-a may have a first SSB beam pattern 410-a. An SSB burst 405-b may have a second SSB beam pattern 410-b, which may have a different pattern of beam indexes for SSBs. Similarly, an SSB burst 405-c may have a third SSB beam pattern 410-c, and an SSB burst 405-d may have a fourth SSB beam pattern 410-d, each of which may be randomized based on an output of the PRF.

FIG. 5 illustrates an example of a frequency domain randomization 500 that supports security for downlink signaling in accordance with one or more aspects of the present disclosure.

A UE 115 may receive SSBs in an SSB burst from a network entity 105. Frequency domain information for the SSB burst may be randomized based on a PRF as described herein. For example, the UE 115 or the network entity 105, or both, may input one or more keys, time information, and a cell identifier into the PRF, and the PRF may output frequency information for SSB bursts.

SSBs may be mapped on a synchronization raster in a frequency bandwidth. For example, in the frequency domain, a hopping position may be on one point or position defined as a synchronization raster. The frequency bandwidth may be equal to or smaller than the carrier bandwidth for secure communications.

In some examples, regardless of how SSBs are hopped in the frequency domain, SIB1 or an RRC message may indicate an absolute frequency of SSBs, a reference point (e.g., Point A 515), and an offset from the reference point to the SSBs. For example, a network entity 105 may indicate the absolute frequency of the SSBs (e.g., absoluteFrequencySSB), the reference point (e.g., absoluteFrequency-PointA), and the offset from the reference point to the SSBs (OffsetToPointA). In some examples, the offset from the reference point to the SSBs may be a fixed offset. The parameters may be reinterpreted based on the same PRF so that the CRB grid or CRB indexes are fixed or unchanged over time.

For example, for an SSB burst 505-*a*, the UE 115-*a* may determine a position of the SSB burst 505-*a* in the frequency domain based on reinterpreting an offset 510-*a* and the Point A 515 using a PRF. Similarly, the UE 115-*a* may determine a position of an SSB burst 505-*b*, an SSB burst 505-*c*, and an SSB burst 505-*d* based on reinterpreting an offset 510-*b*, an offset 510-*c*, and an offset 510-*d*, respectively, from the Point A 515 using the PRF.

In some examples, the UE 115 may reinterpret a symbol per half-frame or per slot based on the PRF. For example, at a subcarrier spacing of 15 kHz, there may be $\{2+8\}+14n$ symbols per half-frame, and the index of candidate SSBs may be n=0, 1 for sub-3 GHz and n=0, 1, 2, 3 for radio frequency spectrum bands over 3 GHz. In some examples, the UE 115 may reinterpret the indexes for the candidate SSBs based on the PRF.

Figure 6:
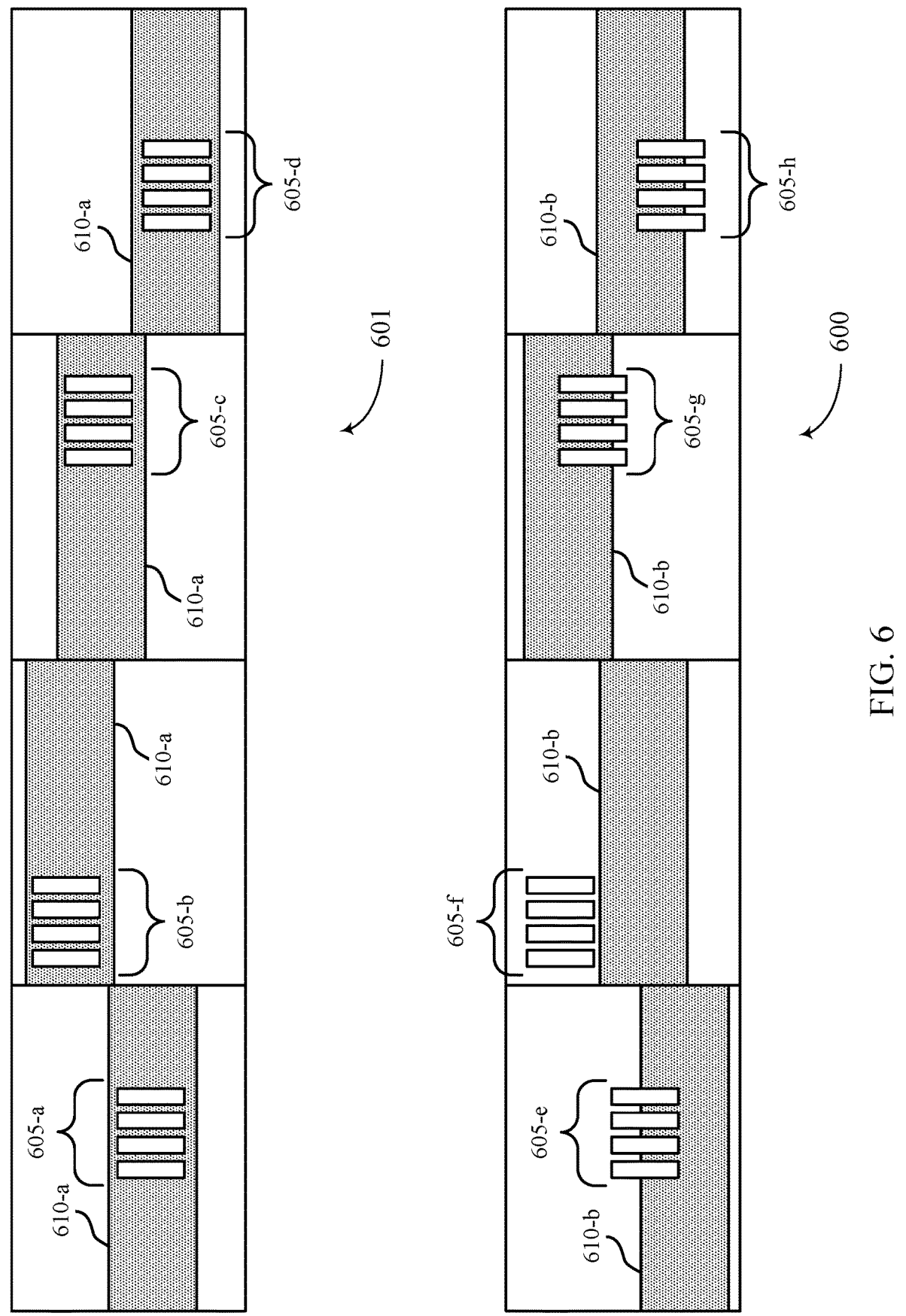
FIG. 6 illustrates examples of initial bandwidth part configurations that support security for downlink signaling in accordance with one or more aspects of the present disclosure.

FIG. 6 illustrates examples of an initial bandwidth part configuration 600 and an initial bandwidth part configuration 601 that support security for downlink signaling in accordance with one or more aspects of the present disclosure.

A UE 115 may receive SSBs in an SSB burst from a network entity 105, and frequency information, timing information, sequence information, or beam index information, or any combination thereof, may be randomized for the SSBs or the SSB burst. In some examples, an initial bandwidth part or a control resource set, such as an initial control resource set or a control resource set 0, may correspond with time-frequency resources of the SSB bursts.

For example, for the initial bandwidth part configuration 600, an initial bandwidth part 610-*a* may be hopped over time and frequency resources that are synchronized with the SSBs. For example, the initial bandwidth part 610-*a* may be synchronized with time and frequency resources for an SSB burst 605-*a* at a first instance, an SSB burst 605-*b* at a second instance, an SSB burst 605-*c* at a third instance, and an SSB burst 605-*d* at a fourth instance. In some examples, the SSB indexes may be unchanged, and in other examples, the SSB indexes may be changed (e.g., using an PRF). In some examples, the initial bandwidth part configuration 600 may support using a narrow bandwidth for initial access.

In some examples, an initial bandwidth part may be randomized based on the PRF. For example, in the initial bandwidth part configuration 601, an initial bandwidth part 610-*b* may be hopped over time and frequency resources independently from the SSBs. For example, the initial bandwidth part 610-*b* may have a different frequency hopping configuration or frequency hopping values than an SSB burst 605-*e*, an SSB burst 605-*f*, an SSB burst 605-*g*, and an SSB burst 605-*h*. In some examples, the frequency hopping values may be determined based on an output of the PRF as described herein. In some examples, the SSB indexes may be unchanged, and in other examples, the SSB indexes may be changed (e.g., using an PRF). In some examples, the initial bandwidth part configuration 601 may provide additional security for the initial bandwidth part 610-*b* based on the frequency hopping being determined using the PRF.

In some examples, the initial bandwidth part may be mapped on the CRB grid. For example, $k_{SSB}$, or a gap between the SSBs and a common resource block, may be fixed (e.g., unchanged, or not reinterpreted by the PRF) over time so the CRB grid is fixed. In some examples, a configured offset quantity of resource blocks may be used to identify the initial resource block of the initial bandwidth part. For example, the 0th resource block of the initial bandwidth part may be offset from the SSBs of an SSB burst by a quantity of resource blocks (e.g., an offset quantity). The offset quantity of resource blocks may be configured, or preconfigured, at the UE 115, indicated via a secure channel, indicated via an SSB, or any combination thereof.

In some examples, the offset quantity of resource blocks may be reinterpreted by the PRF. For example, a configured quantity of resource blocks which offset the 0th resource block of the initial bandwidth part and the SSBs may be reinterpreted by the PRF to indicate an actual offset between the initial bandwidth part and the SSBs. The UE 115 or the network entity 105, or both, may re-interpret the value of the offset in resource blocks based on the PRF for each SSB burst. In some examples, the key to reinterpret the quantity of offsetting resource blocks may be the same or different from a key used for SSB randomization. The key to reinterpret the offset may be configured, or pre-configured, at the UE 115 or indicated via a secure channel.

In some examples, the initial bandwidth part or initial control resource set may be offset by the SSBs based on a value indicated by a MIB. In some examples, a mapping between the value indicated by the MIB (e.g., a pdcch-ConfigSIB1 indicator in the MIB) and a corresponding row of a table indicating the offset may be interleaved by the PRF. For example, the value indicated by the MIB may be reinterpreted by the PRF output. A mapping interleaving, or re-interpretation of the value, may be based on the PRF for each SSB burst. In some examples, the key used for the PRF for the re-interpretation may be the same or different from a key used for SSB randomization. The key may be configured, or pre-configured, at the UE 115 or indicated via a secure channel.

Figure 7:
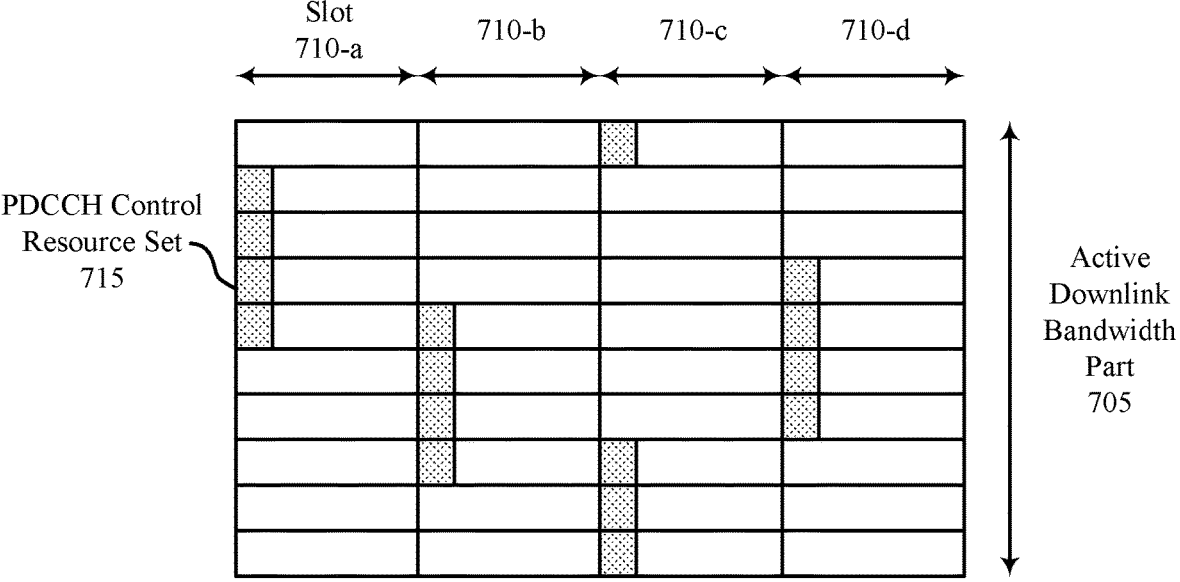
FIG. 7 illustrates an example of a control resource set hopping configuration that supports security for downlink signaling in accordance with one or more aspects of the present disclosure.

FIG. 7 illustrates an example of a control resource set hopping configuration 700 that supports security for downlink signaling in accordance with one or more aspects of the present disclosure.

A UE 115 may receive downlink control signaling from a network entity 105 via a downlink control channel, such as PDCCH. To improve security for control signaling, timing resources, frequency resources, or scrambling information, or any combination thereof, may be randomized based on an output of a PRF as described herein.

For example, a mapping between a frequency domain resource indication and the PRBs of a PDCCH control resource set 715 in a downlink bandwidth part 705 (e.g., an active downlink bandwidth part) may be randomized by the PRF. For example, the UE 115 may receive control signaling indicating frequency domain resources for a control resource set, and a mapping between the indicated frequency domain resources and an actual location of PRBs for a PDCCH control resource set 715 in the downlink bandwidth part 705 may be randomized or interleaved based on the PRF. In some examples, the PRF may use a control resource set identifier as an input for the randomization output.

For example, in slot 710-*a*, a position of the PDCCH control resource set 715 in the frequency domain may be randomized based on an output of a PRF. A UE 115 may receive control signaling indicating a bitmap for frequency domain resources, and the UE 115 may reinterpret the bitmap for the frequency domain resources based on the PRF. For example, an actual frequency domain location of the PRBs for the PDCCH control resource set 715 may be randomized based on the indicated location of the frequency domain resources. Similarly, at slot 710-*b*, the position of the PDCCH control resource set 715 may be randomized, such as being in different PRBs than in slot 710-*a*. In some examples, the UE 115 may determine the frequency allocations for the PRBs of the PDCCH control resource set 715 at each PDCCH monitoring occasion, symbol, subframe, or slot, such as the slot 710-*a*, the slot 710-*b*, a slot 710-*c*, and a slot 710-*d*.

In some examples, the PRBs of the PDCCH control resource set 715 may be randomized such that the PRBs do not exceed an upper bound or edge of the downlink bandwidth part. For example, the PRBs of the PDCCH control resource set 715 may be consecutive within the downlink bandwidth part 705. For example, an i-th bit in the indicated bitmap may indicate that the PRBs of the PDCCH control resource set 715 are mapped on (i+j)-th 6 PRBs in the downlink bandwidth part 705, where j is determined based on the PRF at each PDCCH monitoring occasion, symbol, slot, or subframe, and is selected such that the (i+j)th 6 PRBs do not exceed the upper bound or edge of the downlink bandwidth part 705. For example, the PRBs of the PDCCH control resource set 715 may be consecutive within the downlink bandwidth part 705.

In some examples, the PRBs of the PDCCH control resource set 715 may span across the upper or lower boundaries or edges of the downlink bandwidth part 705. For example, the PRBs of the PDCCH control resource set 715 may be non-consecutive within the downlink bandwidth part 705. For example, the ith bit in the bitmap may indicate that the PDCCH control resource set 715 is mapped on the (i+j)mod N-th 6 PRBs in the downlink bandwidth part 705, where j is determined based on the PRF at each PDCCH monitoring occasion, symbol, slot, or subframe, and N is a quantity of 6 PRBs in the downlink bandwidth part 705. For example, in the slot 710-*c*, the PRBs of the PDCCH control resource set 715 may be at both a highest frequency portion of the downlink bandwidth part 705 and at a lowest frequency portion of the downlink bandwidth part 705, such that the PRBs of the PDCCH control resource set 715 may abut frequency edges of the downlink bandwidth part of the cell.

Figure 8:
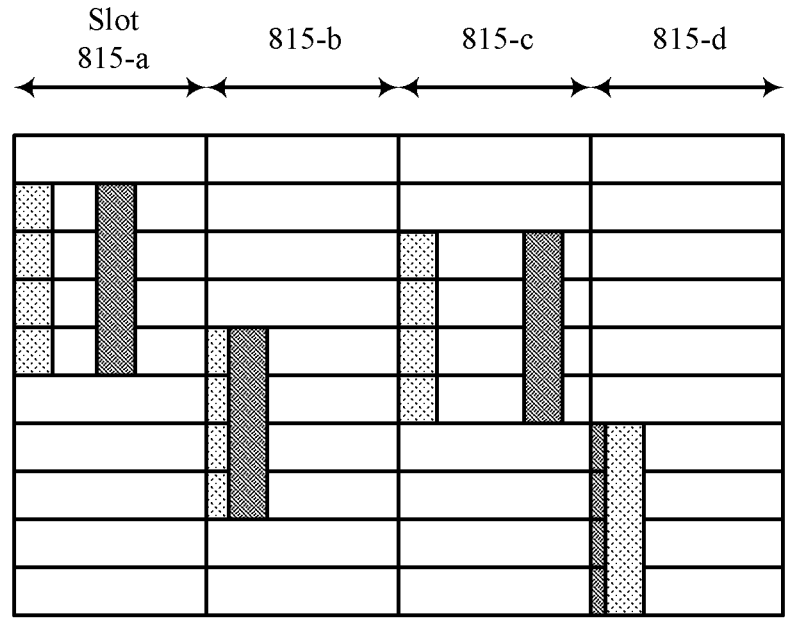
FIG. 8 illustrates an example of a search space set randomization that supports security for downlink signaling in accordance with one or more aspects of the present disclosure.

FIG. 8 illustrates an example of a search space set randomization 800 that supports security for downlink signaling in accordance with one or more aspects of the present disclosure.

A UE 115 may receive downlink control signaling from a network entity 105 via a downlink control channel, such as PDCCH. To improve security for control signaling, timing resources, frequency resources, or scrambling information, or any combination thereof, may be randomized based on an output of a PRF as described herein.

In some examples, a PDCCH monitoring occasion may be randomized by the PRF. For example, a UE 115 may receive control signaling including a search space information element which indicates a PDCCH monitoring occasion, and time or frequency resources for the PDCCH monitoring occasion may be randomized by the PRF. In some examples, the PRF may use a search space identifier as an input for the randomization output. For example, the output indicating the randomized PDCCH monitoring occasions may be based on using a search space identifier as an input.

In some examples, monitoring occasions for a CSS 805 or monitoring occasions for a USS 810, or both, may be randomized. In some examples, the UE 115 may use a UE-common key for the CSS 805. In some examples, the UE 115 may use a UE-specific key for the USS 810.

In some examples, the CSS 805 and the USS 810 may be unaligned based on the randomization. For example, in slot 815-*a* and slot 815-*c*, the USS 810 and the CSS 805 may not overlap in the time domain. In slot 815-*b* and slot 815-*d*, the USS 810 and the CSS 805 may at least partially overlap. If the CSS 805 and the USS 810 are unaligned, the UE 115 may be configured with multiple occasions in a slot.

In some examples, in a slot where the UE 115 has PDCCH monitoring occasions for the CSS 805 and the USS 810 in different spans, the UE 115 may monitor for the USS 810, or for UE-specific information, in the PDCCH monitoring occasion for the CSS 805. For example, in the slot 815-*a*, the UE 115 may monitor PDCCH monitoring occasions for the CSS 805 for both the CSS 805 and the USS 810. For example, UE-specific information may be transmitted to the UE 115 via resources of the CSS 805. In some cases, monitoring for the USS 810 in the CSS 805 may be more efficient and reduce a likelihood that a UE-specific key is unused.

In some other examples, the UE 115 may monitor PDCCH monitoring occasions for the USS 810 for both the CSS 805 and the USS 810. For example, the UE 115 may monitor for the CSS 805, or for UE-common information, in the PDCCH monitoring occasion for the USS 810. In some examples, monitoring for the CSS 805 in the USS 810 may be more secure, as the network entity 105 may transmit the information multiple times for different UEs 115 using different keys.

In a slot where the UE 115 has PDCCH monitoring occasions for both the CSS 805 and the USS 810 in a same span, the UE 115 may monitor both the CSS 805 and the USS 810. For example, in slot 815-*b*, the UE 115 may monitor both the CSS 805 and the USS 810.

Figure 9:
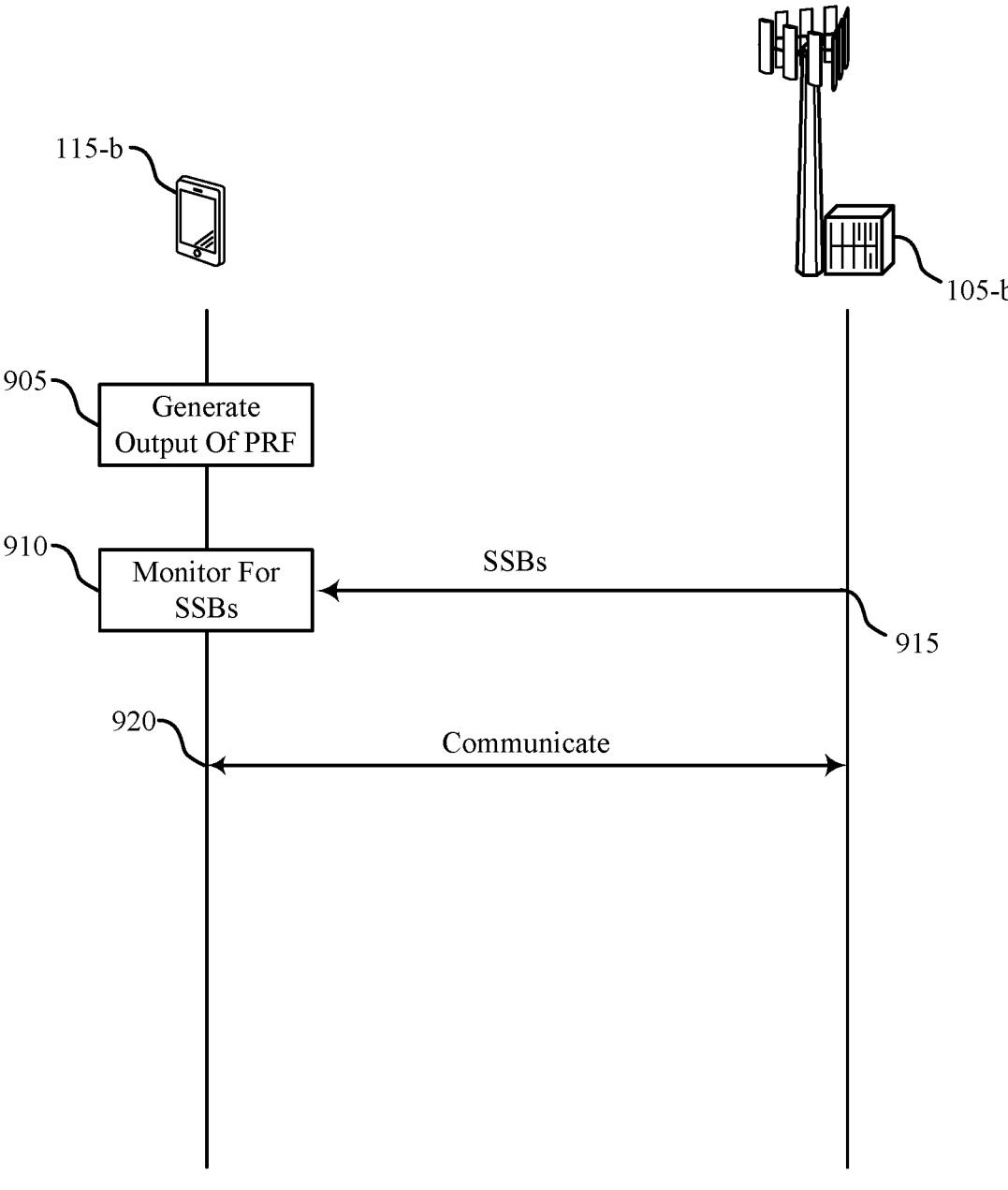
FIG. 9 illustrates an example of a process flow that supports security for downlink signaling in accordance with one or more aspects of the present disclosure.

FIG. 9 illustrates an example of a process flow 900 that supports security for downlink signaling in accordance with one or more aspects of the present disclosure. The process flow 900 may be implemented by a UE 115-*b* or a network entity 105-*b*, or both, which may be respective examples of a UE 115 and a network entity 105 as described herein.

The process flow 900 may illustrate an example of randomizing resources or aspects of an SSB or an SSB burst using a PRF. At 905, the UE 115-*b* may generate an output of the PRF. For example, the UE 115-*b* may input a timing parameter, a key (e.g., a parameter denoting a key), and a cell identifier to the PRF, and the PRF may output information such as timing information, frequency information, sequence information, or beam index information, or any combination thereof, for one or more SSBs, one or more SSB bursts, or an initial control resource set (e.g., an initial downlink bandwidth part), or any combination thereof. In some examples, the key may be a UE-specific key or a UE-common key.

At 910, the UE 115-*b* may monitor a set of resources for one or more SSBs associated with one or more pseudo-random sequences, where the one or more pseudo-random sequences and the set of resources are indicated by an output of a PRF that is based at least in part on the timing parameter, the cell identifier, and the key.

In some examples, the UE 115-*b* may monitor for a burst of SSBs associated with a first pseudo-random sequence of the one or more pseudo-random sequences indicated by the output of the PRF. The UE 115-*b* may monitor for a second burst of SSBs associated with a second pseudo-random sequence of the one or more pseudo-random sequences indicated by the output of the PRF. For example, SSBs in an SSB burst may have a common pseudo-random sequence, but different SSB bursts may have different pseudo-random sequences. In some examples, the UE 115-*b* may generate the first pseudo-random sequence and the second pseudo-random sequence based on one or more calls to the PRF.

In some examples, the UE 115-*b* may monitor for a first SSB, associated with a first pseudo-random sequence of the one or more pseudo-random sequences, of a burst of SSBs, where the first pseudo-random sequence is indicated by the output of the PRF. The UE 115-*b* may monitor for a second SSB, associated with a second pseudo-random sequence of the one or more pseudo-random sequences, of the burst of SSBs, where the second pseudo-random sequence is indicated by the output of the PRF. For example, different SSBs of an SSB burst may have different pseudo-random sequences, and there may also be different pseudo-random sequences across SSB bursts.

In some examples, beam ordering within an SSB burst may be randomized. For example, the UE 115-*b* may monitor for a first burst of SSBs, where a first ordering of SSB indexes for the first burst of SSBs is indicated by the output of the PRF, and the UE 115-*b* may monitor for a second burst of SSBs, where a second ordering of SSB indexes for the second burst of SSBs is indicated by the output of the PRF.

In some examples, time resources for the SSBs or the SSB burst may be randomized based on the output of the PRF. For example, the UE 115-*b* may monitor for a first SSB of a burst of SSBs during a starting symbol of the burst of SSBs, where the starting symbol is indicated by the output of the PRF.

Additionally, or alternatively, frequency resources for the SSBs or the SSB burst may be randomized based on the output of the PRF. For example, the UE 115-*b* may monitor for a first burst of SSBs offset in frequency from a reference point by a first offset indicated by the output of the PRF, and the UE 115-*b* may monitor for a second burst of SSBs offset in frequency from the reference point by a second offset indicated by the output of the PRF.

At 915, the network entity 105-*b* may transmit SSBs associated with the one or more pseudo-random sequences via the set of resources. In some examples, the network entity 105-*b* may similarly determine, generate, or identify the pseudo-random sequences and the set of resources based on an output of a PRF. At 920, the UE 115-*b* may communicate with the network entity 105-*b* via a cell associated with the cell identifier based on monitoring the set of resources for the one or more SSBs.

Figure 10:
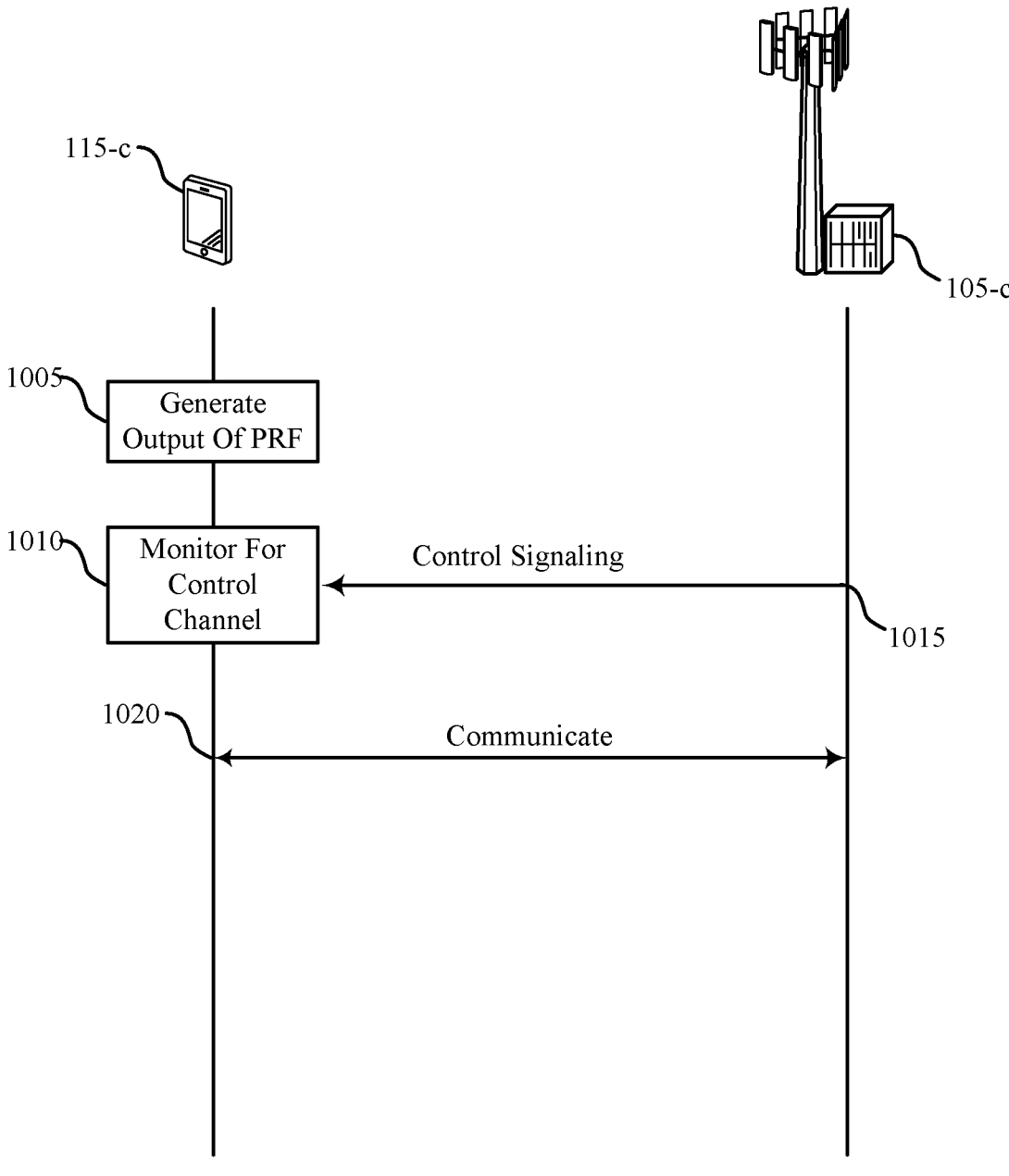
FIG. 10 illustrates an example of a process flow that supports security for downlink signaling in accordance with one or more aspects of the present disclosure.

FIG. 10 illustrates an example of a process flow 1000 that supports security for downlink signaling in accordance with one or more aspects of the present disclosure. The process flow 1000 may be implemented by a UE 115-*c* or a network entity 105-*c*, or both, which may be respective examples of a UE 115 and a network entity 105 as described herein.

The process flow 1000 may illustrate an example of randomizing resources or aspects of a downlink control channel using a PRF. At 1005, the UE 115-*c* may generate an output of the PRF. For example, the UE 115-*b* may input a timing parameter, a key, and a cell identifier to the PRF, and the PRF may output information such as timing information, frequency information, or scrambling information, or any combination thereof, for a downlink control channel, a control resource set, a monitoring occasions, or any combination thereof.

At 1010, the UE 115-*c* may monitor a set of resources within a control resource set for a downlink control channel. The set of resources may be based on an output of a PRF, where the output of the PRF is based on the timing parameter, the cell identifier, and the key.

In some examples, the UE 115-*c* may monitor a first set of resource blocks for a first downlink control channel, where a first initial resource block of the first set of resource blocks is indicated by the output of the PRF, and the UE 115-*c* may monitor a second set of resource blocks for a second downlink control channel, where a second initial resource block of the second set of resource blocks is indicated by the output of the PRF. In some examples, the first set of resource blocks are consecutive within a downlink bandwidth part of the cell. In some examples, the first set of resource blocks are non-consecutive and abut frequency edges of a downlink bandwidth part of the cell.

In some examples, the UE 115-*c* may determine the control resource set from a set of multiple control resource sets based on the output of the PRF, where the output of the PRF is based on a search space identifier for a search space of the downlink control channel. In some examples, the UE 115-*c* may monitor a subset of search space sets from a set of multiple search space sets, where the subset of search space sets is indicated by the output of the PRF.

In some examples, the UE 115-*c* may determine a set of parameters for the control resource set from multiple sets of parameters, where the set of parameters is indicated by the output of the PRF. In some examples, the control resource set includes a frequency domain resource allocation, a control resource set duration, a control channel element-to-resource element group mapping, a precoder granularity, a transmission configuration indicator state, or any combination thereof.

In some examples, the UE 115-*c* may determine a set of parameters for a search space set for the downlink control channel from multiple sets of parameters, where the set of parameters is indicated by the output of the PRF. In some examples, the set of parameters for the search space set includes a monitoring periodicity or resource indicators for monitoring occasions, or both.

At 1015, the network entity 105-*c* may transmit control signaling on the downlink control channel via the set of resources within the control resource set. In some examples, the network entity 105-*b* may similarly determine, generate, or identify the information for the downlink control channel based on an output of a PRF. At 1020, the UE 115-*c* may communicate with the network entity 105-*c* via a cell associated with the cell identifier based on monitoring the set of resources for the downlink control channel.

Figure 11:
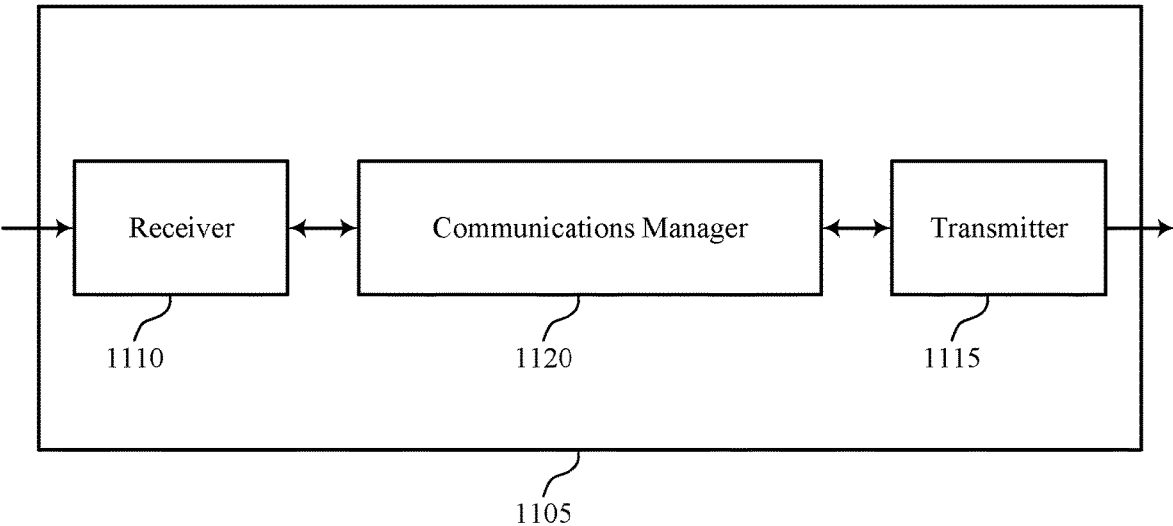
FIGS. 11 and 12 illustrate block diagrams of devices that support security for downlink signaling in accordance with one or more aspects of the present disclosure.

FIG. 11 illustrates a block diagram 1100 of a device 1105 that supports security for downlink signaling in accordance with one or more aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to security for downlink signaling). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to security for downlink signaling). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of security for downlink signaling as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. For example, the communications manager 1120 may be configured as or otherwise support a means for monitoring a set of resources for one or more synchronization signal blocks associated with one or more pseudo-random sequences, where the one or more pseudo-random sequences and the set of resources are indicated by an output of a pseudo-random function that is based on a timing parameter, a cell identifier, and a key. The communications manager 1120 may be configured as or otherwise support a means for communicating with a network entity via a cell associated with the cell identifier based on monitoring the set of resources for the one or more synchronization signal blocks.

Additionally, or alternatively, the communications manager 1120 may support wireless communications at a UE in accordance with examples as disclosed herein. For example, the communications manager 1120 may be configured as or otherwise support a means for monitoring a set of resources within a control resource set for a downlink control channel, where the set of resources is based on an output of a pseudo-random function, and where the output of the pseudo-random function is based on a timing parameter, a cell identifier, and a key. The communications manager 1120 may be configured as or otherwise support a means for communicating with a network entity via a cell associated with the cell identifier based on monitoring the set of resources for the downlink control channel.

Additionally, or alternatively, the communications manager 1120 may support wireless communications at a UE in accordance with examples as disclosed herein. For example, the communications manager 1120 may be configured as or otherwise support a means for monitoring a set of resources for a control message via a downlink control channel. The communications manager 1120 may be configured as or otherwise support a means for descrambling a payload of the control message based on a scrambling sequence, where the scrambling sequence is indicated by an output of a pseudo-random function that is based on a timing parameter, a cell identifier, and a key.

Additionally, or alternatively, the communications manager 1120 may support wireless communications at a UE in accordance with examples as disclosed herein. For example, the communications manager 1120 may be configured as or otherwise support a means for monitoring a set of resources for a control message via a downlink control channel. The communications manager 1120 may be configured as or otherwise support a means for demodulating the control message based on a set of multiple demodulation reference signals received via the downlink control channel, where sequences for the set of multiple demodulation reference signals are indicated by an output of a pseudo-random function that is based on a timing parameter, a cell identifier, and a key.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for higher security initial access signaling and control signaling.

Figure 12:
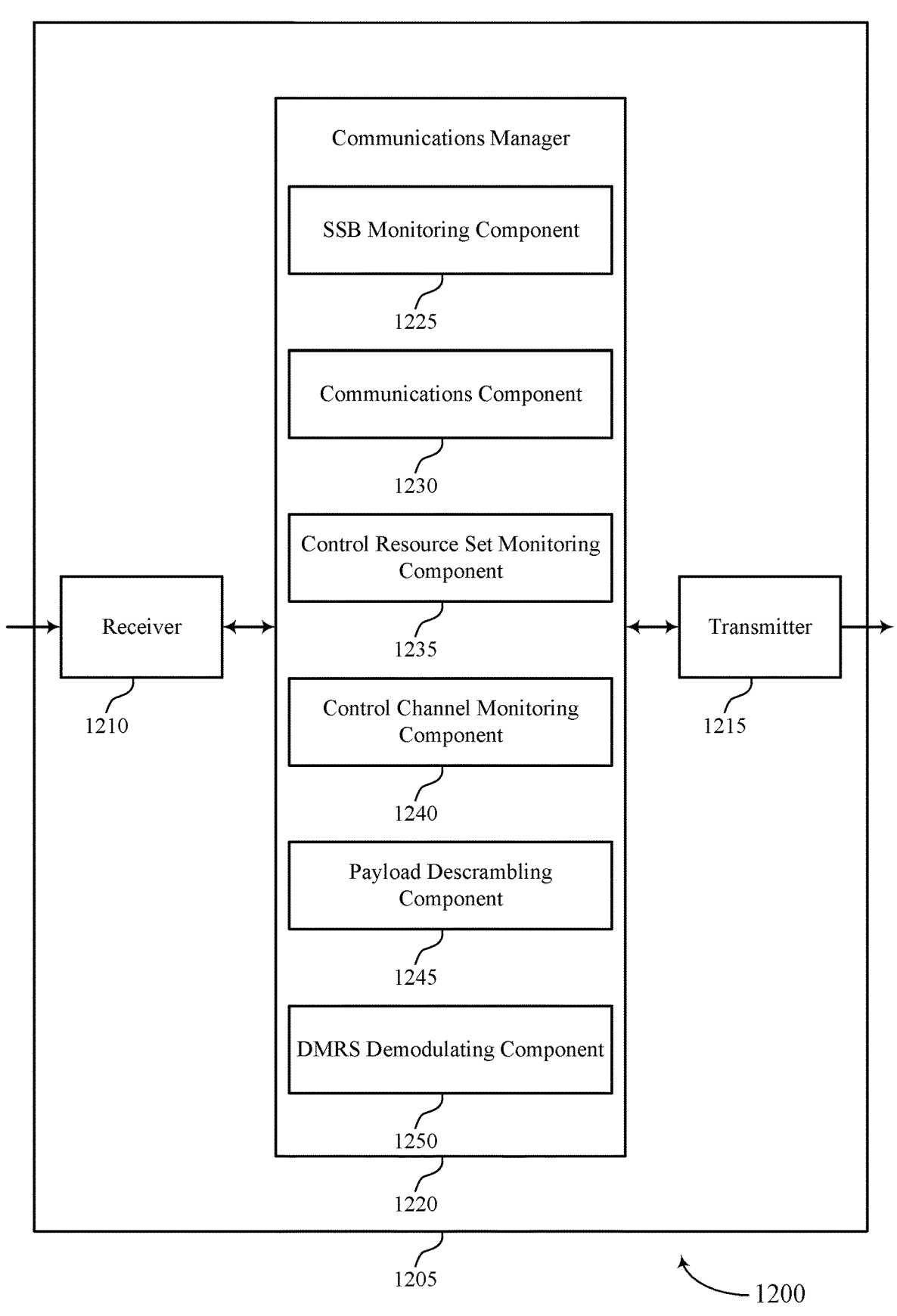

FIG. 12 illustrates a block diagram 1200 of a device 1205 that supports security for downlink signaling in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to security for downlink signaling).

Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to security for downlink signaling). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of security for downlink signaling as described herein. For example, the communications manager 1220 may include an SSB monitoring component 1225, a communications component 1230, a control resource set monitoring component 1235, a control channel monitoring component 1240, a payload descrambling component 1245, a DMRS demodulating component 1250, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a UE in accordance with examples as disclosed herein. The SSB monitoring component 1225 may be configured as or otherwise support a means for monitoring a set of resources for one or more synchronization signal blocks associated with one or more pseudo-random sequences, where the one or more pseudo-random sequences and the set of resources are indicated by an output of a pseudo-random function that is based on a timing parameter, a cell identifier, and a key. The communications component 1230 may be configured as or otherwise support a means for communicate with a network entity via a cell associated with the cell identifier based on monitoring the set of resources for the one or more synchronization signal blocks.

Additionally, or alternatively, the communications manager 1220 may support wireless communications at a UE in accordance with examples as disclosed herein. The control resource set monitoring component 1235 may be configured as or otherwise support a means for monitoring a set of resources within a control resource set for a downlink control channel, where the set of resources is based on an output of a pseudo-random function, and where the output of the pseudo-random function is based on a timing parameter, a cell identifier, and a key. The communications component 1230 may be configured as or otherwise support a means for communicate with a network entity via a cell associated with the cell identifier based on monitoring the set of resources for the downlink control channel.

Additionally, or alternatively, the communications manager 1220 may support wireless communications at a UE in accordance with examples as disclosed herein. The control channel monitoring component 1240 may be configured as or otherwise support a means for monitoring a set of resources for a control message via a downlink control channel. The payload descrambling component 1245 may be configured as or otherwise support a means for descrambling a payload of the control message based on a scrambling sequence, where the scrambling sequence is indicated by an output of a pseudo-random function that is based on a timing parameter, a cell identifier, and a key.

Additionally, or alternatively, the communications manager 1220 may support wireless communications at a UE in accordance with examples as disclosed herein. The control channel monitoring component 1240 may be configured as or otherwise support a means for monitoring a set of resources for a control message via a downlink control channel. The DMRS demodulating component 1250 may be configured as or otherwise support a means for demodulating the control message based on a set of multiple demodulation reference signals received via the downlink control channel, where sequences for the set of multiple demodulation reference signals are indicated by an output of a pseudo-random function that is based on a timing parameter, a cell identifier, and a key.

Figure 13:
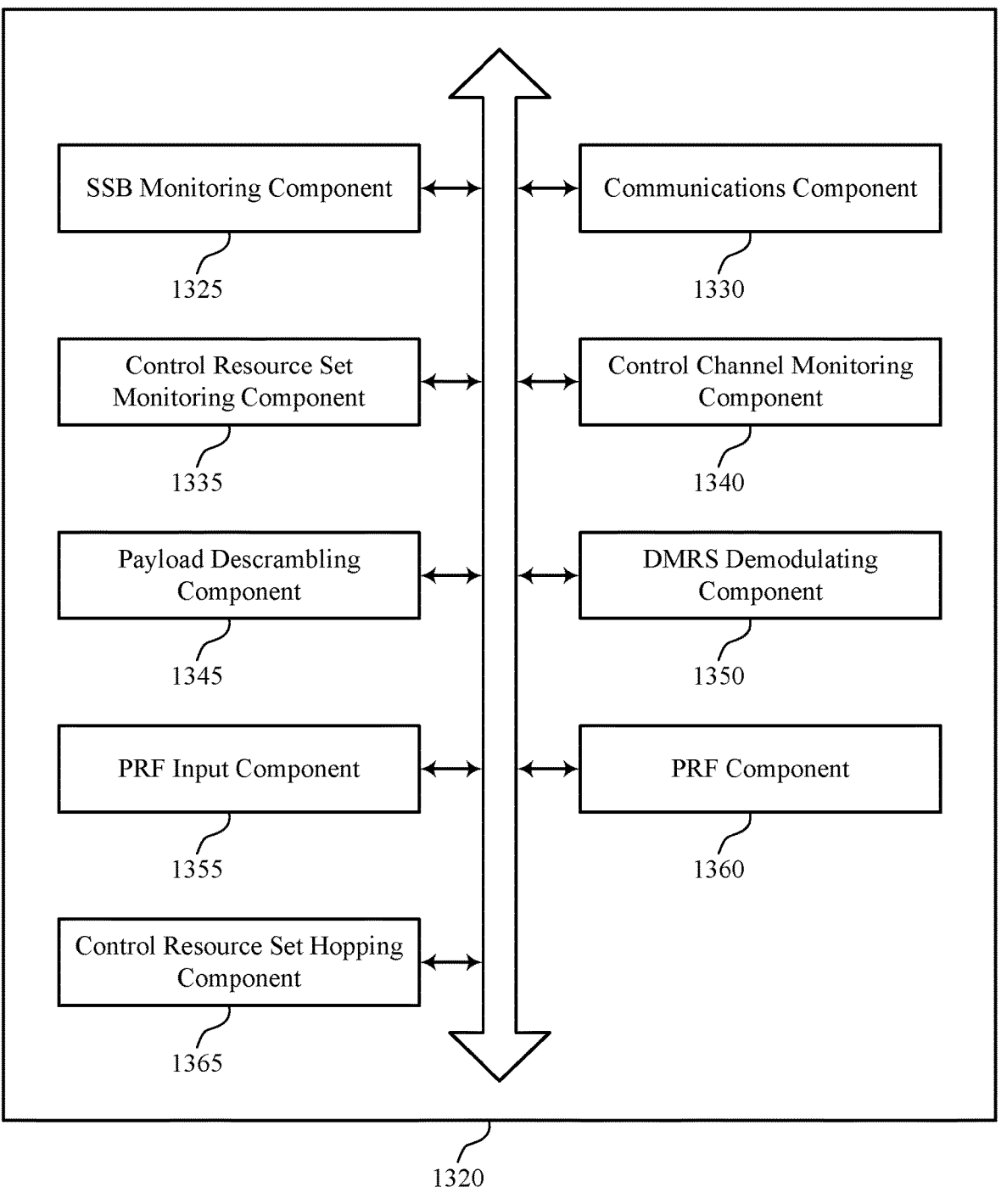
FIG. 13 illustrates a block diagram of a communications manager that supports security for downlink signaling in accordance with one or more aspects of the present disclosure.

FIG. 13 illustrates a block diagram 1300 of a communications manager 1320 that supports security for downlink signaling in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of security for downlink signaling as described herein. For example, the communications manager 1320 may include an SSB monitoring component 1325, a communications component 1330, a control resource set monitoring component 1335, a control channel monitoring component 1340, a payload descrambling component 1345, a DMRS demodulating component 1350, an PRF input component 1355, an PRF component 1360, a control resource set hopping component 1365, or any combination thereof. Each of these components may communicate, directly or indirectly, with one another (e.g., via one or more buses).

The communications manager 1320 may support wireless communications at a UE in accordance with examples as disclosed herein. The SSB monitoring component 1325 may be configured as or otherwise support a means for monitoring a set of resources for one or more synchronization signal blocks associated with one or more pseudo-random sequences, where the one or more pseudo-random sequences and the set of resources are indicated by an output of a pseudo-random function that is based on a timing parameter, a cell identifier, and a key. The communications component 1330 may be configured as or otherwise support a means for communicate with a network entity via a cell associated with the cell identifier based on monitoring the set of resources for the one or more synchronization signal blocks.

In some examples, to support monitoring the set of resources, the SSB monitoring component 1325 may be configured as or otherwise support a means for monitoring for a first burst of synchronization signal blocks associated with a first pseudo-random sequence of the one or more pseudo-random sequences indicated by the output of the pseudo-random function. In some examples, to support monitoring the set of resources, the SSB monitoring component 1325 may be configured as or otherwise support a means for monitoring for a second burst of synchronization signal blocks associated with a second pseudo-random sequence of the one or more pseudo-random sequences indicated by the output of the pseudo-random function.

In some examples, the PRF component 1360 may be configured as or otherwise support a means for generating the first pseudo-random sequence and the second pseudo-random sequence based on one or more calls to the pseudo-random function.

In some examples, to support monitoring the set of resources, the SSB monitoring component 1325 may be configured as or otherwise support a means for monitoring for a first synchronization signal block, associated with a first pseudo-random sequence of the one or more pseudo-random sequences, of a burst of synchronization signal blocks, where the first pseudo-random sequence is indicated by the output of the pseudo-random function. In some examples, to support monitoring the set of resources, the SSB monitoring component 1325 may be configured as or otherwise support a means for monitoring for a second synchronization signal block, associated with a second pseudo-random sequence of the one or more pseudo-random sequences, of the burst of synchronization signal blocks, where the second pseudo-random sequence is indicated by the output of the pseudo-random function.

In some examples, to support monitoring the set of resources, the SSB monitoring component 1325 may be configured as or otherwise support a means for monitoring for a first burst of synchronization signal blocks, where a first ordering of synchronization signal block indexes for the first burst of synchronization blocks is indicated by the output of the pseudo-random function. In some examples, to support monitoring the set of resources, the SSB monitoring component 1325 may be configured as or otherwise support a means for monitoring for a second burst of synchronization signal blocks, where a second ordering of synchronization signal block indexes for the second burst of synchronization blocks is indicated by the output of the pseudo-random function.

In some examples, the output of the pseudo-random function indicates the first ordering and the second ordering based on a quantity of symbols per half-frame.

In some examples, the SSB monitoring component 1325 may be configured as or otherwise support a means for monitoring for a first synchronization signal block of a burst of synchronization signal blocks during a starting symbol of the burst of synchronization signal blocks, where the starting symbol is indicated by the output of the pseudo-random function.

In some examples, the output of the pseudo-random function indicates the starting symbol of the burst of synchronization signal blocks based on a quantity of symbols per half-frame.

In some examples, to support monitoring the set of resources, the SSB monitoring component 1325 may be configured as or otherwise support a means for monitoring for a first burst of synchronization signal blocks offset in frequency from a reference point by a first offset indicated by the output of the pseudo-random function. In some examples, to support monitoring the set of resources, the SSB monitoring component 1325 may be configured as or otherwise support a means for monitoring for a second burst of synchronization signal blocks offset in frequency from the reference point by a second offset indicated by the output of the pseudo-random function.

In some examples, the output of the pseudo-random function indicates a first index of a synchronization raster for the first offset and a second index of the synchronization raster for the second offset.

In some examples, to support monitoring the set of resources, the SSB monitoring component 1325 may be configured as or otherwise support a means for monitoring for a first synchronization signal in a first synchronization signal block of the one or more synchronization signal blocks, where a first sequence of the first synchronization signal is indicated by the output of the pseudo-random function. In some examples, to support monitoring the set of resources, the SSB monitoring component 1325 may be configured as or otherwise support a means for monitoring for a second synchronization signal in the first synchronization signal block, where a second sequence of the second synchronization signal is indicated by the output of the pseudo-random function.

In some examples, the control resource set monitoring component 1335 may be configured as or otherwise support a means for monitoring a control resource set that is offset in frequency from the one or more synchronization signal blocks by a fixed quantity of resource blocks.

In some examples, the control resource set monitoring component 1335 may be configured as or otherwise support a means for monitoring, for a first duration, a control resource set according to a first offset in frequency from a first burst of synchronization signal blocks of the one or more synchronization signal blocks, the first offset indicated by the output of the pseudo-random function. In some examples, the control resource set monitoring component 1335 may be configured as or otherwise support a means for monitoring, for a second duration, the control resource set according to a second offset in frequency from a second burst of synchronization signal blocks of the one or more synchronization signal blocks, the second offset indicated by the output of the pseudo-random function.

In some examples, the first offset is indicated by the output of the pseudo-random function based on a first value indicated by a first master information block of the first burst of synchronization signal blocks, and the second offset is indicated by the output of the pseudo-random function based on a second value indicated by a second master information block of the second burst of synchronization signal blocks.

In some examples, the PRF input component 1355 may be configured as or otherwise support a means for receiving, via a secure wireless channel, a control message indicating the key, where the key is a UE-specific key or a UE-common key.

Additionally, or alternatively, the communications manager 1320 may support wireless communications at a UE in accordance with examples as disclosed herein. The control resource set monitoring component 1335 may be configured as or otherwise support a means for monitoring a set of resources within a control resource set for a downlink control channel, where the set of resources is based on an output of a pseudo-random function, and where the output of the pseudo-random function is based on a timing parameter, a cell identifier, and a key. In some examples, the communications component 1330 may be configured as or otherwise support a means for communicate with a network entity via a cell associated with the cell identifier based on monitoring the set of resources for the downlink control channel.

In some examples, to support monitoring the set of resources, the control resource set monitoring component 1335 may be configured as or otherwise support a means for monitoring a first set of resource blocks for a first downlink control channel, where a first initial resource block of the first set of resource blocks is indicated by the output of the pseudo-random function. In some examples, to support monitoring the set of resources, the control resource set monitoring component 1335 may be configured as or otherwise support a means for monitoring a second set of resource blocks for a second downlink control channel, where a second initial resource block of the second set of resource blocks is indicated by the output of the pseudo-random function.

In some examples, the first set of resource blocks are consecutive within a downlink bandwidth part of the cell.

In some examples, the first set of resource blocks are non-consecutive and abut frequency edges of a downlink bandwidth part of the cell.

In some examples, the PRF component 1360 may be configured as or otherwise support a means for determining the control resource set from a set of multiple control resource sets based on the output of the pseudo-random function, where the output of the pseudo-random function is based on a search space identifier for a search space of the downlink control channel.

In some examples, the control resource set hopping component 1365 may be configured as or otherwise support a means for receiving control signaling indicating that a control resource set hopping is enabled, where the control resource set is determined from the set of multiple control resource sets based on the control resource set hopping being enabled.

In some examples, to support monitoring the set of resources, the control resource set monitoring component 1335 may be configured as or otherwise support a means for monitoring a subset of search space sets from a set of multiple search space sets, where the subset of search space sets is indicated by the output of the pseudo-random function.

In some examples, the PRF component 1360 may be configured as or otherwise support a means for determining a set of parameters for the control resource set from a set of multiple sets of parameters, where the set of parameters is indicated by the output of the pseudo-random function.

In some examples, the set of parameters for the control resource set includes a frequency domain resource allocation, a control resource set duration, a control channel element-to-resource element group mapping, a precoder granularity, a transmission configuration indicator state, or any combination thereof.

In some examples, the PRF component 1360 may be configured as or otherwise support a means for determining a set of parameters for a search space set for the downlink control channel from a set of multiple sets of parameters, where the set of parameters is indicated by the output of the pseudo-random function.

In some examples, the set of parameters for the search space set includes a monitoring periodicity or resource indicators for monitoring occasions, or both.

Additionally, or alternatively, the communications manager 1320 may support wireless communications at a UE in accordance with examples as disclosed herein. The control channel monitoring component 1340 may be configured as or otherwise support a means for monitoring a set of resources for a control message via a downlink control channel. The payload descrambling component 1345 may be configured as or otherwise support a means for descrambling a payload of the control message based on a scrambling sequence, where the scrambling sequence is indicated by an output of a pseudo-random function that is based on a timing parameter, a cell identifier, and a key.

In some examples, determining an initial value for the scrambling sequence based on the output of the pseudo-random function. In some examples, descrambling the payload is based on the initial value for the scrambling sequence.

Additionally, or alternatively, the communications manager 1320 may support wireless communications at a UE in accordance with examples as disclosed herein. In some examples, the control channel monitoring component 1340 may be configured as or otherwise support a means for monitoring a set of resources for a control message via a downlink control channel. The DMRS demodulating component 1350 may be configured as or otherwise support a means for demodulating the control message based on a set of multiple demodulation reference signals received via the downlink control channel, where sequences for the set of multiple demodulation reference signals are indicated by an output of a pseudo-random function that is based on a timing parameter, a cell identifier, and a key.

In some examples, the DMRS demodulating component 1350 may be configured as or otherwise support a means for determining quadrature phase shift keying symbols for the set of multiple demodulation reference signals based on the sequences for the set of multiple demodulation reference signals.

Figure 14:
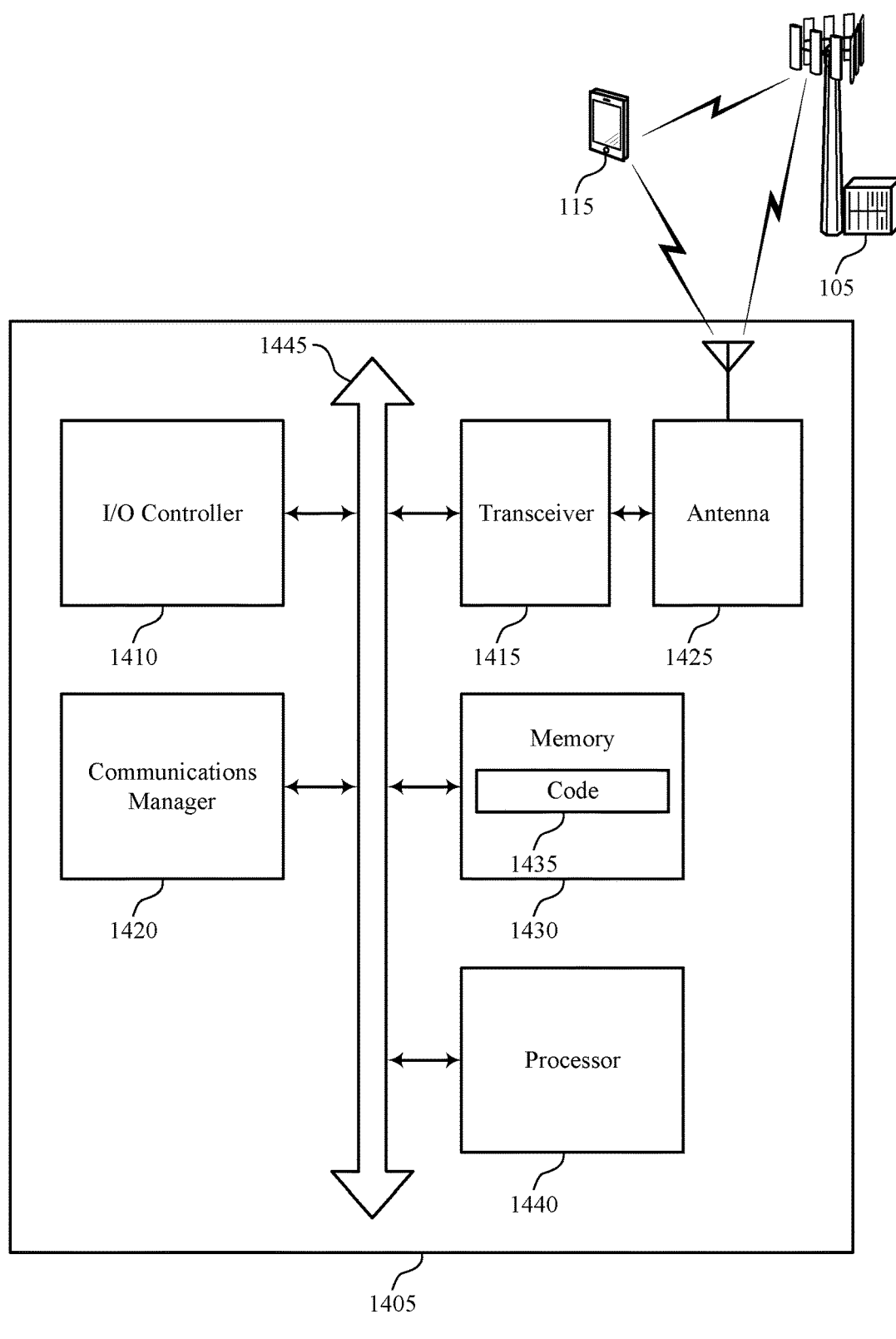
FIG. 14 illustrates a diagram of a system including a device that supports security for downlink signaling in accordance with one or more aspects of the present disclosure.

FIG. 14 illustrates a diagram of a system 1400 including a device 1405 that supports security for downlink signaling in accordance with one or more aspects of the present disclosure. The device 1405 may be an example of or include the components of a device 1105, a device 1205, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting security for downlink signaling). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communications at a UE in accordance with examples as disclosed herein. For example, the communications manager 1420 may be configured as or otherwise support a means for monitoring a set of resources for one or more synchronization signal blocks associated with one or more pseudo-random sequences, where the one or more pseudo-random sequences and the set of resources are indicated by an output of a pseudo-random function that is based on a timing parameter, a cell identifier, and a key. The communications manager 1420 may be configured as or otherwise support a means for communicating with a network entity via a cell associated with the cell identifier based on monitoring the set of resources for the one or more synchronization signal blocks.

Additionally, or alternatively, the communications manager 1420 may support wireless communications at a UE in accordance with examples as disclosed herein. For example, the communications manager 1420 may be configured as or otherwise support a means for monitoring a set of resources within a control resource set for a downlink control channel, where the set of resources is based on an output of a pseudo-random function, and where the output of the pseudo-random function is based on a timing parameter, a cell identifier, and a key. The communications manager 1420 may be configured as or otherwise support a means for communicating with a network entity via a cell associated with the cell identifier based on monitoring the set of resources for the downlink control channel.

Additionally, or alternatively, the communications manager 1420 may support wireless communications at a UE in accordance with examples as disclosed herein. For example, the communications manager 1420 may be configured as or otherwise support a means for monitoring a set of resources for a control message via a downlink control channel. The communications manager 1420 may be configured as or otherwise support a means for descrambling a payload of the control message based on a scrambling sequence, where the scrambling sequence is indicated by an output of a pseudo-random function that is based on a timing parameter, a cell identifier, and a key.

Additionally, or alternatively, the communications manager 1420 may support wireless communications at a UE in accordance with examples as disclosed herein. For example, the communications manager 1420 may be configured as or otherwise support a means for monitoring a set of resources for a control message via a downlink control channel. The communications manager 1420 may be configured as or otherwise support a means for demodulating the control message based on a set of multiple demodulation reference signals received via the downlink control channel, where sequences for the set of multiple demodulation reference signals are indicated by an output of a pseudo-random function that is based on a timing parameter, a cell identifier, and a key.

By including or configuring the communications manager 1420 in accordance with examples as described herein, the device 1405 may support techniques for higher security initial access signaling and control signaling.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of security for downlink signaling as described herein, or the processor 1440 and the memory 1430 may be otherwise configured to perform or support such operations.

FIG. 15 illustrates a flowchart illustrating a method 1500 that supports security for downlink signaling in accordance with one or more aspects of the present disclosure. The operations of the method 1500 may be implemented by a UE or its components as described herein. For example, the operations of the method 1500 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1505, the method may include monitoring a set of resources for one or more synchronization signal blocks associated with one or more pseudo-random sequences, where the one or more pseudo-random sequences and the set of resources are indicated by an output of a pseudo-random function that is based on a timing parameter, a cell identifier, and a key. The operations of 1505 may be performed in accordance with examples as disclosed herein. In some examples, aspects of the operations of 1505 may be performed by an SSB monitoring component 1325 as described with reference to FIG. 13.

At 1510, the method may include communicate with a network entity via a cell associated with the cell identifier based on monitoring the set of resources for the one or more synchronization signal blocks. The operations of 1510 may be performed in accordance with examples as disclosed herein. In some examples, aspects of the operations of 1510 may be performed by a communications component 1330 as described with reference to FIG. 13.

Figure 16:
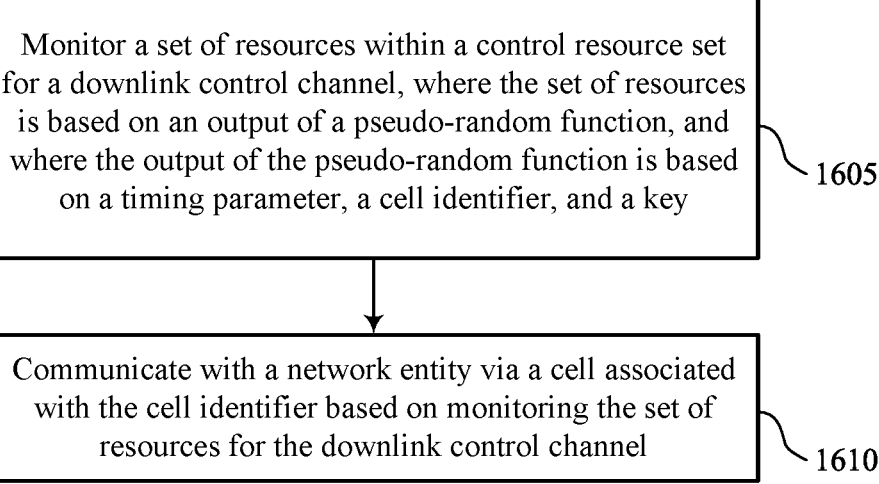

FIG. 16 illustrates a flowchart illustrating a method 1600 that supports security for downlink signaling in accordance with one or more aspects of the present disclosure. The operations of the method 1600 may be implemented by a UE or its components as described herein. For example, the operations of the method 1600 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1605, the method may include monitoring a set of resources within a control resource set for a downlink control channel, where the set of resources is based on an output of a pseudo-random function, and where the output of the pseudo-random function is based on a timing parameter, a cell identifier, and a key. The operations of 1605 may be performed in accordance with examples as disclosed herein. In some examples, aspects of the operations of 1605 may be performed by a control resource set monitoring component 1335 as described with reference to FIG. 13.

At 1610, the method may include communicate with a network entity via a cell associated with the cell identifier based on monitoring the set of resources for the downlink control channel. The operations of 1610 may be performed in accordance with examples as disclosed herein. In some examples, aspects of the operations of 1610 may be performed by a communications component 1330 as described with reference to FIG. 13.

Figure 17:
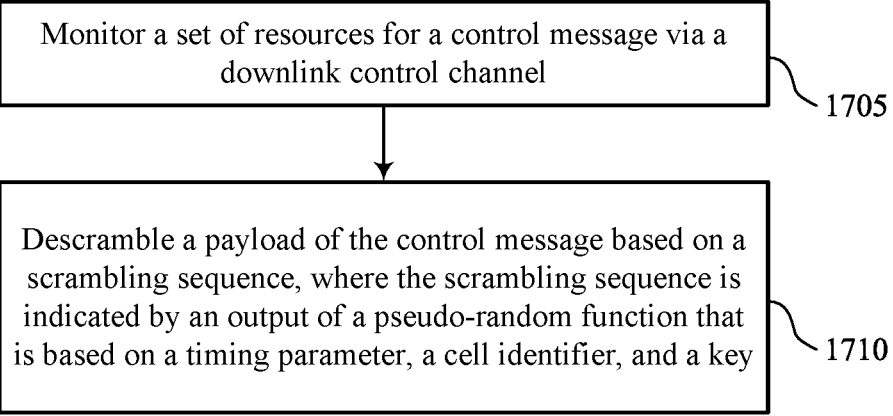

FIG. 17 illustrates a flowchart illustrating a method 1700 that supports security for downlink signaling in accordance with one or more aspects of the present disclosure. The operations of the method 1700 may be implemented by a UE or its components as described herein. For example, the operations of the method 1700 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1705, the method may include monitoring a set of resources for a control message via a downlink control channel. The operations of 1705 may be performed in accordance with examples as disclosed herein. In some examples, aspects of the operations of 1705 may be performed by a control channel monitoring component 1340 as described with reference to FIG. 13.

At 1710, the method may include descrambling a payload of the control message based on a scrambling sequence, where the scrambling sequence is indicated by an output of a pseudo-random function that is based on a timing parameter, a cell identifier, and a key. The operations of 1710 may be performed in accordance with examples as disclosed herein. In some examples, aspects of the operations of 1710 may be performed by a payload descrambling component 1345 as described with reference to FIG. 13.

Figure 18:
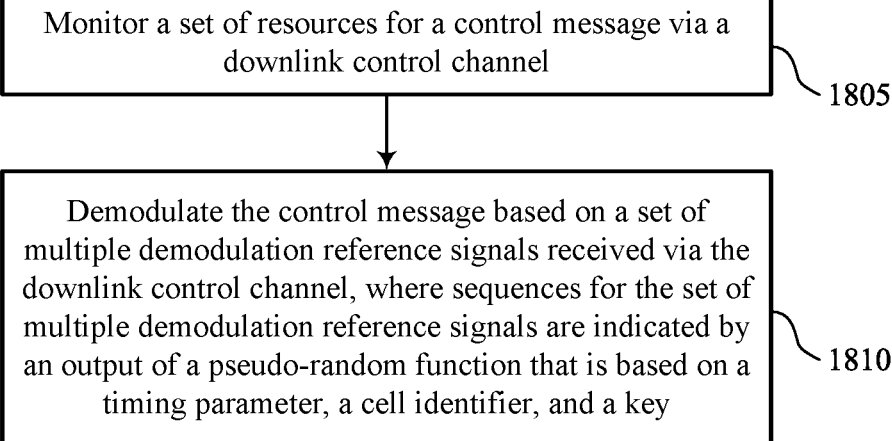

FIG. 18 illustrates a flowchart illustrating a method 1800 that supports security for downlink signaling in accordance with one or more aspects of the present disclosure. The operations of the method 1800 may be implemented by a UE or its components as described herein. For example, the operations of the method 1800 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1805, the method may include monitoring a set of resources for a control message via a downlink control channel. The operations of 1805 may be performed in accordance with examples as disclosed herein. In some examples, aspects of the operations of 1805 may be performed by a control channel monitoring component 1340 as described with reference to FIG. 13.

At 1810, the method may include demodulating the control message based on a set of multiple demodulation reference signals received via the downlink control channel, where sequences for the set of multiple demodulation reference signals are indicated by an output of a pseudo-random function that is based on a timing parameter, a cell identifier, and a key. The operations of 1810 may be performed in accordance with examples as disclosed herein. In some examples, aspects of the operations of 1810 may be performed by a DMRS demodulating component 1350 as described with reference to FIG. 13.

The following provides an overview of aspects of the present disclosure:

Aspect 1: A method for wireless communications at a UE, comprising: monitoring a set of resources for one or more synchronization signal blocks associated with one or more pseudo-random sequences, wherein the one or more pseudo-random sequences and the set of resources are indicated by an output of a pseudo-random function that is based at least in part on a timing parameter, a cell identifier, and a key; and communicate with a network entity via a cell associated with the cell identifier based at least in part on monitoring the set of resources for the one or more synchronization signal blocks.

Aspect 2: The method of aspect 1, wherein monitoring the set of resources comprises: monitoring for a first burst of synchronization signal blocks associated with a first pseudo-random sequence of the one or more pseudo-random sequences indicated by the output of the pseudo-random function; and monitoring for a second burst of synchronization signal blocks associated with a second pseudo-random sequence of the one or more pseudo-random sequences indicated by the output of the pseudo-random function.

Aspect 3: The method of aspect 2, further comprising: generating the first pseudo-random sequence and the second pseudo-random sequence based at least in part on one or more calls to the pseudo-random function.

Aspect 4: The method of any of aspects 1 through 3, wherein monitoring the set of resources comprises: monitoring for a first synchronization signal block, associated with a first pseudo-random sequence of the one or more pseudo-random sequences, of a burst of synchronization signal blocks, wherein the first pseudo-random sequence is indicated by the output of the pseudo-random function; and monitoring for a second synchronization signal block, associated with a second pseudo-random sequence of the one or more pseudo-random sequences, of the burst of synchronization signal blocks, wherein the second pseudo-random sequence is indicated by the output of the pseudo-random function.

Aspect 5: The method of any of aspects 1 through 4, wherein monitoring the set of resources comprises: monitoring for a first burst of synchronization signal blocks, wherein a first ordering of synchronization signal block indexes for the first burst of synchronization blocks is indicated by the output of the pseudo-random function; and monitoring for a second burst of synchronization signal blocks, wherein a second ordering of synchronization signal block indexes for the second burst of synchronization blocks is indicated by the output of the pseudo-random function.

Aspect 6: The method of aspect 5, wherein the output of the pseudo-random function indicates the first ordering and the second ordering based at least in part on a quantity of symbols per half-frame.

Aspect 7: The method of any of aspects 1 through 6, further comprising: monitoring for a first synchronization signal block of a burst of synchronization signal blocks during a starting symbol of the burst of synchronization signal blocks, wherein the starting symbol is indicated by the output of the pseudo-random function.

Aspect 8: The method of aspect 7, wherein the output of the pseudo-random function indicates the starting symbol of the burst of synchronization signal blocks based at least in part on a quantity of symbols per half-frame.

Aspect 9: The method of any of aspects 1 through 8, wherein monitoring the set of resources comprises: monitoring for a first burst of synchronization signal blocks offset in frequency from a reference point by a first offset indicated by the output of the pseudo-random function; and monitoring for a second burst of synchronization signal blocks offset in frequency from the reference point by a second offset indicated by the output of the pseudo-random function.

Aspect 10: The method of aspect 9, wherein the output of the pseudo-random function indicates a first index of a synchronization raster for the first offset and a second index of the synchronization raster for the second offset.

Aspect 11: The method of any of aspects 1 through 10, wherein monitoring the set of resources comprises: monitoring for a first synchronization signal in a first synchronization signal block of the one or more synchronization signal blocks, wherein a first sequence of the first synchronization signal is indicated by the output of the pseudo-random function; and monitoring for a second synchronization signal in the first synchronization signal block, wherein a second sequence of the second synchronization signal is indicated by the output of the pseudo-random function.

Aspect 12: The method of any of aspects 1 through 11, further comprising: monitoring a control resource set that is offset in frequency from the one or more synchronization signal blocks by a fixed quantity of resource blocks.

Aspect 13: The method of any of aspects 1 through 12, further comprising: monitoring, for a first duration, a control resource set according to a first offset in frequency from a first burst of synchronization signal blocks of the one or more synchronization signal blocks, the first offset indicated by the output of the pseudo-random function; and monitoring, for a second duration, the control resource set according to a second offset in frequency from a second burst of synchronization signal blocks of the one or more synchronization signal blocks, the second offset indicated by the output of the pseudo-random function.

Aspect 14: The method of aspect 13, wherein the first offset is indicated by the output of the pseudo-random function based at least in part on a first value indicated by a first master information block of the first burst of synchronization signal blocks, and the second offset is indicated by the output of the pseudo-random function based at least in part on a second value indicated by a second master information block of the second burst of synchronization signal blocks.

Aspect 15: The method of any of aspects 1 through 14, further comprising: receiving, via a secure wireless channel, a control message indicating the key, wherein the key is a UE-specific key or a UE-common key.

Aspect 16: A method for wireless communications at a UE, comprising: monitoring a set of resources within a control resource set for a downlink control channel, wherein the set of resources is based at least in part on an output of a pseudo-random function, and wherein the output of the pseudo-random function is based at least in part on a timing parameter, a cell identifier, and a key; and communicate with a network entity via a cell associated with the cell identifier based at least in part on monitoring the set of resources for the downlink control channel.

Aspect 17: The method of aspect 16, wherein monitoring the set of resources comprises: monitoring a first set of resource blocks for a first downlink control channel, wherein a first initial resource block of the first set of resource blocks is indicated by the output of the pseudo-random function; and monitoring a second set of resource blocks for a second downlink control channel, wherein a second initial resource block of the second set of resource blocks is indicated by the output of the pseudo-random function.

Aspect 18: The method of aspect 17, wherein the first set of resource blocks are consecutive within a downlink bandwidth part of the cell.

Aspect 19: The method of any of aspects 17 through 18, wherein the first set of resource blocks are non-consecutive and abut frequency edges of a downlink bandwidth part of the cell.

Aspect 20: The method of any of aspects 16 through 19, further comprising: determining the control resource set from a plurality of control resource sets based at least in part on the output of the pseudo-random function, wherein the output of the pseudo-random function is based at least in part on a search space identifier for a search space of the downlink control channel.

Aspect 21: The method of aspect 20, further comprising: receiving control signaling indicating that a control resource set hopping is enabled, wherein the control resource set is determined from the plurality of control resource sets based at least in part on the control resource set hopping being enabled.

Aspect 22: The method of any of aspects 16 through 21, wherein monitoring the set of resources comprises: monitoring a subset of search space sets from a plurality of search space sets, wherein the subset of search space sets is indicated by the output of the pseudo-random function.

Aspect 23: The method of any of aspects 16 through 22, further comprising: determining a set of parameters for the control resource set from a plurality of sets of parameters, wherein the set of parameters is indicated by the output of the pseudo-random function.

Aspect 24: The method of aspect 23, wherein the set of parameters for the control resource set includes a frequency domain resource allocation, a control resource set duration, a control channel element-to-resource element group mapping, a precoder granularity, a transmission configuration indicator state, or any combination thereof.

Aspect 25: The method of any of aspects 16 through 24, further comprising: determining a set of parameters for a search space set for the downlink control channel from a plurality of sets of parameters, wherein the set of parameters is indicated by the output of the pseudo-random function.

Aspect 26: The method of aspect 25, wherein the set of parameters for the search space set includes a monitoring periodicity or resource indicators for monitoring occasions, or both.

Aspect 27: A method for wireless communications at a UE, comprising: monitoring a set of resources for a control message via a downlink control channel; and descrambling a payload of the control message based at least in part on a scrambling sequence, wherein the scrambling sequence is indicated by an output of a pseudo-random function that is based at least in part on a timing parameter, a cell identifier, and a key.

Aspect 28: The method of aspect 27, wherein determining an initial value for the scrambling sequence based at least in part on the output of the pseudo-random function, and descrambling the payload is based at least in part on the initial value for the scrambling sequence.

Aspect 29: A method for wireless communications at a UE, comprising: monitoring a set of resources for a control message via a downlink control channel; and demodulating the control message based at least in part on a plurality of demodulation reference signals received via the downlink control channel, wherein sequences for the plurality of demodulation reference signals are indicated by an output of a pseudo-random function that is based at least in part on a timing parameter, a cell identifier, and a key.

Aspect 30: The method of aspect 29, further comprising: determining quadrature phase shift keying symbols for the plurality of demodulation reference signals based at least in part on the sequences for the plurality of demodulation reference signals.

Aspect 31: An apparatus for wireless communications at a UE, comprising a processor; memory coupled with the processor; and instructions stored in the memory and executable by the processor to cause the apparatus to perform a method of any of aspects 1 through 15.

Aspect 32: An apparatus for wireless communications at a UE, comprising at least one means for performing a method of any of aspects 1 through 15.

Aspect 33: A non-transitory computer-readable medium storing code for wireless communications at a UE, the code comprising instructions executable by a processor to perform a method of any of aspects 1 through 15.

Aspect 34: An apparatus for wireless communications at a UE, comprising a processor; memory coupled with the processor; and instructions stored in the memory and executable by the processor to cause the apparatus to perform a method of any of aspects 16 through 26.

Aspect 35: An apparatus for wireless communications at a UE, comprising at least one means for performing a method of any of aspects 16 through 26.

Aspect 36: A non-transitory computer-readable medium storing code for wireless communications at a UE, the code comprising instructions executable by a processor to perform a method of any of aspects 16 through 26.

Aspect 37: An apparatus for wireless communications at a UE, comprising a processor; memory coupled with the processor; and instructions stored in the memory and executable by the processor to cause the apparatus to perform a method of any of aspects 27 through 28.

Aspect 38: An apparatus for wireless communications at a UE, comprising at least one means for performing a method of any of aspects 27 through 28.

Aspect 39: A non-transitory computer-readable medium storing code for wireless communications at a UE, the code comprising instructions executable by a processor to perform a method of any of aspects 27 through 28.

Aspect 40: An apparatus for wireless communications at a UE, comprising a processor; memory coupled with the processor; and instructions stored in the memory and executable by the processor to cause the apparatus to perform a method of any of aspects 29 through 30.

Aspect 41: An apparatus for wireless communications at a UE, comprising at least one means for performing a method of any of aspects 29 through 30.

Aspect 42: A non-transitory computer-readable medium storing code for wireless communications at a UE, the code comprising instructions executable by a processor to perform a method of any of aspects 29 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

one or more processors; and one or more memories coupled with the one or more processors, the one or more memories storing instructions executable by the one or more processors to cause the apparatus to:

monitor a set of resources, indicated by a pseudo-random function, for one or more synchronization signal blocks, the one or more synchronization signal blocks associated with one or more pseudo-random sequences, wherein the one or more pseudo-random sequences and the set of resources are indicated by an output of the pseudo-random function that is based at least in part on a timing parameter, a cell identifier, and a key, wherein the instructions to monitor the set of resources are further executable by the one or more processors to cause the apparatus to:

monitor for a first burst of synchronization signal blocks, wherein a first ordering of synchronization signal block indexes for the first burst of synchronization blocks is indicated by the output of the pseudo-random function; and monitor for a second burst of synchronization signal blocks, wherein a second ordering of synchronization signal block indexes for the second burst of synchronization blocks is indicated by the output of the pseudo-random function, wherein the output of the pseudo-random function indicates the first ordering and the second ordering based at least in part on a quantity of symbols per half-frame; and communicate with a network entity via a cell associated with the cell identifier based at least in part on monitoring the set of resources for the one or more synchronization signal blocks.

2. The apparatus of claim 1, wherein the instructions to monitor the set of resources are executable by the one or more processors to cause the apparatus to:

monitor for the first burst of synchronization signal blocks associated with a first pseudo-random sequence of the one or more pseudo-random sequences indicated by the output of the pseudo-random function; and monitor for the second burst of synchronization signal blocks associated with a second pseudo-random sequence of the one or more pseudo-random sequences indicated by the output of the pseudo-random function.

3. The apparatus of claim 2, wherein the instructions are further executable by the one or more processors to cause the apparatus to:

generate the first pseudo-random sequence and the second pseudo-random sequence based at least in part on one or more calls to the pseudo-random function.

4. The apparatus of claim 1, wherein the instructions to monitor the set of resources are executable by the one or more processors to cause the apparatus to:

monitor for a first synchronization signal block, associated with a first pseudo-random sequence of the one or more pseudo-random sequences, of the first burst of synchronization signal blocks, wherein the first pseudo-random sequence is indicated by the output of the pseudo-random function; and monitor for a second synchronization signal block, associated with a second pseudo-random sequence of the one or more pseudo-random sequences, of the first burst of synchronization signal blocks, wherein the second pseudo-random sequence is indicated by the output of the pseudo-random function.

5. The apparatus of claim 1, wherein the instructions are further executable by the one or more processors to cause the apparatus to:

monitor for a first synchronization signal block of the first burst of synchronization signal blocks during a starting symbol of the first burst of synchronization signal blocks, wherein the starting symbol is indicated by the output of the pseudo-random function.

6. The apparatus of claim 5, wherein the output of the pseudo-random function indicates the starting symbol of the first burst of synchronization signal blocks based at least in part on a quantity of symbols per half-frame.

7. The apparatus of claim 1, wherein the instructions to monitor the set of resources are executable by the one or more processors to cause the apparatus to:

monitor for the first burst of synchronization signal blocks offset in frequency from a reference point by a first offset indicated by the output of the pseudo-random function; and monitor for the second burst of synchronization signal blocks offset in frequency from the reference point by a second offset indicated by the output of the pseudo-random function.

8. The apparatus of claim 7, wherein the output of the pseudo-random function indicates a first index of a synchronization raster for the first offset and a second index of the synchronization raster for the second offset.

9. The apparatus of claim 1, wherein the instructions to monitor the set of resources are executable by the one or more processors to cause the apparatus to:

monitor for a first synchronization signal in a first synchronization signal block of the one or more synchronization signal blocks, wherein a first sequence of the first synchronization signal is indicated by the output of the pseudo-random function; and monitor for a second synchronization signal in the first synchronization signal block, wherein a second sequence of the second synchronization signal is indicated by the output of the pseudo-random function.

10. The apparatus of claim 1, wherein the instructions are further executable by the one or more processors to cause the apparatus to:

monitor a control resource set that is offset in frequency from the one or more synchronization signal blocks by a fixed quantity of resource blocks.

11. The apparatus of claim 1, wherein the instructions are further executable by the one or more processors to cause the apparatus to:

monitor, for a first duration, a control resource set according to a first offset in frequency from the first burst of synchronization signal blocks, the first offset indicated by the output of the pseudo-random function; and monitor, for a second duration, the control resource set according to a second offset in frequency from the second burst of synchronization signal blocks, the second offset indicated by the output of the pseudo-random function.

12. The apparatus of claim 11, wherein the first offset is indicated by the output of the pseudo-random function based at least in part on a first value indicated by a first master information block of the first burst of synchronization signal blocks, and the second offset is indicated by the output of the pseudo-random function based at least in part on a second value indicated by a second master information block of the second burst of synchronization signal blocks.

13. The apparatus of claim 1, wherein the instructions are further executable by the one or more processors to cause the apparatus to:

receive, via a secure wireless channel, a control message indicating the key, wherein the key is a UE-specific key or a UE-common key.

14. An apparatus for wireless communications at a user equipment (UE), comprising:

one or more processors; and one or more memories coupled with the one or more processors, the one or more memories storing instructions executable by the one or more processors to cause the apparatus to:

determine a set of parameters for a control resource set from a plurality of sets of parameters, wherein the set of parameters is indicated by an output of a pseudo-random function;

monitor a set of resources, indicated by the pseudo-random function, within the control resource set for a downlink control channel, wherein the set of resources is based at least in part on an output of the pseudo-random function, and wherein the output of the pseudo-random function is based at least in part on a timing parameter, a cell identifier, and a key; and communicate with a network entity via a cell associated with the cell identifier based at least in part on monitoring the set of resources for the downlink control channel.

15. The apparatus of claim 14, wherein the instructions to monitor the set of resources are executable by the one or more processors to cause the apparatus to:

monitor a first set of resource blocks for a first downlink control channel, wherein a first initial resource block of the first set of resource blocks is indicated by the output of the pseudo-random function; and monitor a second set of resource blocks for a second downlink control channel, wherein a second initial resource block of the second set of resource blocks is indicated by the output of the pseudo-random function.

16. The apparatus of claim 15, wherein the first set of resource blocks are consecutive within a downlink bandwidth part of the cell.

17. The apparatus of claim 15, wherein the first set of resource blocks are non-consecutive and abut frequency edges of a downlink bandwidth part of the cell.

18. The apparatus of claim 14, wherein the instructions are further executable by the one or more processors to cause the apparatus to:

determine the control resource set from a plurality of control resource sets based at least in part on the output of the pseudo-random function, wherein the output of the pseudo-random function is based at least in part on a search space identifier for a search space of the downlink control channel.

19. The apparatus of claim 18, wherein the instructions are further executable by the one or more processors to cause the apparatus to:

receive control signaling indicating that a control resource set hopping is enabled, wherein the control resource set is determined from the plurality of control resource sets based at least in part on the control resource set hopping being enabled.

20. The apparatus of claim 14, wherein the instructions to monitor the set of resources are executable by the one or more processors to cause the apparatus to:

monitor a subset of search space sets from a plurality of search space sets, wherein the subset of search space sets is indicated by the output of the pseudo-random function.

21. The apparatus of claim 14, wherein the set of parameters for the control resource set includes a frequency domain resource allocation, a control resource set duration, a control channel element-to-resource element group mapping, a precoder granularity, a transmission configuration indicator state, or any combination thereof.

22. The apparatus of claim 14, wherein the instructions are further executable by the one or more processors to cause the apparatus to:

determine a set of parameters for a search space set for the downlink control channel from a plurality of sets of parameters, wherein the set of parameters is indicated by the output of the pseudo-random function.

23. The apparatus of claim 22, wherein the set of parameters for the search space set includes a monitoring periodicity or resource indicators for monitoring occasions, or both.

24. A method of wireless communication at a user equipment (UE), comprising:

monitoring a set of resources, indicated by a pseudo-random function, for one or more synchronization signal blocks, the one or more synchronization signal blocks associated with one or more pseudo-random sequences, wherein the one or more pseudo-random sequences and the set of resources are indicated by an output of the pseudo-random function that is based at least in part on a timing parameter, a cell identifier, and a key, wherein monitoring the set of resources comprises:

monitoring for a first burst of synchronization signal blocks, wherein a first ordering of synchronization signal block indexes for the first burst of synchronization blocks is indicated by the output of the pseudo-random function; and monitoring for a second burst of synchronization signal blocks, wherein a second ordering of synchronization signal block indexes for the second burst of synchronization blocks is indicated by the output of the pseudo-random function, wherein the output of the pseudo-random function indicates the first ordering and the second ordering based at least in part on a quantity of symbols per half-frame; and communicating with a network entity via a cell associated with the cell identifier based at least in part on monitoring the set of resources for the one or more synchronization signal blocks.

25. The method of claim 24, further comprising:

receiving, via a secure wireless channel, a control message indicating the key, wherein the key is a UE-specific key or a UE-common key.

26. The method of claim 24, wherein the set of resources indicated by the pseudo-random function comprises one or more of:

time resources;

frequency resources; or frequency hopping values.

27. A method of wireless communication at a user equipment (UE), comprising:

determining a set of parameters for a control resource set from a plurality of sets of parameters, wherein the set of parameters is indicated by an output of a pseudo-random function;

monitoring a set of resources, indicated by the pseudo-random function, within the control resource set for a downlink control channel, wherein the set of resources is based at least in part on an output of the pseudo-random function, and wherein the output of the pseudo-random function is based at least in part on a timing parameter, a cell identifier, and a key; and communicating with a network entity via a cell associated with the cell identifier based at least in part on monitoring the set of resources for the downlink control channel.

\* \* \* \* \*